United States Patent
Xu et al.

(10) Patent No.: US 11,503,336 B2
(45) Date of Patent: Nov. 15, 2022

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/459,645

(22) Filed: Aug. 27, 2021

(65) Prior Publication Data

US 2022/0182664 A1 Jun. 9, 2022

Related U.S. Application Data

(60) Provisional application No. 63/122,343, filed on Dec. 7, 2020.

(51) Int. Cl.
| | |
|---|---|
| *H04N 19/593* | (2014.01) |
| *H04N 19/176* | (2014.01) |
| *H04N 19/46* | (2014.01) |
| *H04N 19/61* | (2014.01) |
| *H04N 19/18* | (2014.01) |
| *H04N 19/105* | (2014.01) |

(52) U.S. Cl.
CPC ......... *H04N 19/593* (2014.11); *H04N 19/105* (2014.11); *H04N 19/176* (2014.11); *H04N 19/18* (2014.11); *H04N 19/46* (2014.11); *H04N 19/61* (2014.11)

(58) Field of Classification Search
None
See application file for complete search history.

(56) References Cited

U.S. PATENT DOCUMENTS

| | | |
|---|---|---|
| 10,027,981 B2 | 7/2018 | Xu et al. |
| 10,045,038 B2 | 8/2018 | Liu et al. |
| 10,051,277 B2 | 8/2018 | Ye et al. |
| 10,075,712 B2 | 9/2018 | Liu et al. |

(Continued)

OTHER PUBLICATIONS

R. Joshi et al., "High Efficiency Video Coding (HEVC) Screen Content Coding: Draft 4", ISO/IEC JTC1/SC 29/WG 11, Document: JCTVC-U1005_r1, Jun. 19-25, 2015, 663 pages.

(Continued)

*Primary Examiner* — Chikaodili E Anyikire
(74) *Attorney, Agent, or Firm* — Arentfox Schiff LLP

(57) ABSTRACT

Aspects of the disclosure provide a method and an apparatus including processing circuitry for video decoding. The processing circuitry can decode coded information for a current block in a current picture from a coded video bitstream. The coded information can indicate a string copy mode for the current block. The current block includes a current string. The processing circuitry can determine whether a flipping operation is performed to predict the current string. Based on the flipping operation being determined as performed to predict the current string, the processing circuitry can determine an original reference string based on a string vector of the current string. The processing circuitry can generate a flipped reference string by performing the flipping operation on the original reference string, and reconstruct the current string based on the flipped reference string.

18 Claims, 25 Drawing Sheets

(56) References Cited

U.S. PATENT DOCUMENTS

| | | | |
|---|---|---|---|
| 10,341,651 B2 * | 7/2019 | Lin | H04N 19/129 |
| 10,362,331 B2 | 7/2019 | Liu et al. | |
| 10,397,568 B2 | 8/2019 | Liu et al. | |
| 10,448,026 B1 | 10/2019 | Xu et al. | |
| 10,462,468 B2 | 10/2019 | Xu et al. | |
| 10,511,834 B2 | 12/2019 | Xu et al. | |
| 10,542,253 B2 | 1/2020 | Liu et al. | |
| 10,575,013 B2 | 2/2020 | Liu et al. | |
| 10,638,137 B2 | 4/2020 | Xu et al. | |
| 10,701,385 B1 | 6/2020 | Xu et al. | |
| 10,812,817 B2 * | 10/2020 | Li | H04N 19/11 |
| 10,820,016 B2 * | 10/2020 | Lin | H04N 19/103 |
| 2016/0330455 A1 * | 11/2016 | Lin | H04N 19/172 |
| 2017/0238001 A1 * | 8/2017 | Li | H04N 19/129 |
| | | | 375/240.12 |
| 2018/0205971 A1 * | 7/2018 | Lin | H04N 19/13 |

OTHER PUBLICATIONS

Xiaozhong XU et al., "Intra Block Copy in HEVC Screen Content Coding Extensions", IEEE Journal on Emerging and Selected Topics in Circuits and Systems, vol. 6, Issue 4, 11 pages.

Shan Liu et al., "Overview of HEVC extensions on screen content coding", APSIPA Transactions on Signal and Information Processing, vol. 4 Revised Aug. 8, 2015, 12 pages.

R. Joshi et al., "Screen content coding test model 1 (SCM 1)", Document JCTVC-Q1014, Valencia, Spain, Mar. 27-Apr. 4, 2014, 5 pages.

Xiaozhong Xu et al., "Block vector prediction for intra block copying in HEVC screen content coding", 2015 Data Compression Conference, 273-282.

Wang et al., Intra Block Copy in AVS3 Video Coding Standard, Sep. 2020, 6 pages.

Xiaozhong Xu et al., Current Picture Referencing in Versatile Video Coding, 2019 IEEE Conference on Multimedia Information Processing and Retrieval (MIPR) 2019, pp. 26-31.

Xiaozhong Xu et al., Intra block copy in Versatile Video Coding with Reference Sample Memory Reuse, IEEE, 2020, 5 pages.

Xiang Li et al., Description of SDR video coding technology proposal by Tencent, Document: JVET-J0029-v1, Joint Video Experts Team (JVET) of ITU-T SG 16 WP 3 and ISO/IEC JTC 1/SC 29/WG 11, 10th Meeting: San Diego, US, Apr. 10-20, 2018, 34 pages.

Wei Pu et al., Palette Mode Coding in HEVC Screen Content Coding Extension, IEEE Journal on Emerging and Selected Topics in Circuits and Systems, vol. 6, No. 4, Dec. 2016, 13 pages.

Benjamin Bross et al., Versatile Video Coding (Draft 2), Document: JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018, 140 pages.

* cited by examiner

METHOD AND APPARATUS FOR VIDEO CODING

INCORPORATION BY REFERENCE

This present disclosure claims the benefit of priority to U.S. Provisional Application No. 63/122,343, "String matching with flipping operations" filed on Dec. 7, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode coded information for a current block in a current picture from a coded video bitstream. The coded information can indicate a string copy mode for the current block. The current block can include a current string. The processing circuitry can determine whether a flipping operation is performed to predict the current string. Based on the flipping operation being determined as performed to predict the current string, the processing circuitry can determine an original reference string based on a string vector of the current string. The processing circuitry can generate a flipped reference string by performing the flipping operation on the original reference string, and reconstruct the current string based on the flipped reference string.

In an embodiment, the flipping operation is one of (i) a vertical flipping operation, (ii) a horizontal flipping operation, and (iii) a combined flipping operation. The processing circuitry can generate the flipped reference string by vertically flipping the original reference string based on the flipping operation being the vertical flipping operation. The processing circuitry can generate the flipped reference string by horizontally flipping the original reference string based on the flipping operation being the horizontal flipping operation. The processing circuitry can generate the flipped reference string by vertically and horizontally flipping the original reference string based on the flipping operation being the combined flipping operation.

In an example, the coded information includes a string-level flag for the current string after a string length of the current string, the string-level flag indicating whether the flipping operation is performed to predict the current string.

In an embodiment, the current string is one of a plurality of strings included in the current block. The coded information can include a block-level flag for the current block. A first value of the block-level flag can indicate that each of the plurality of strings is to be predicted using a respective flipping operation, and a second value of the block-level flag can indicate that no flipping operation is to be performed on the plurality of strings. The flipping operation can be determined as performed to predict the current string based on the block-level flag having the first value. In an example, the processing circuitry determines that the flipping operation is prohibited for the current string based on a number of the plurality of strings in the current block being larger than a first threshold.

In an embodiment, the coded information includes a string-level flag of the current string. The processing circuitry can determine that the flipping operation is performed to predict the current string based on the string-level flag indicating that the flipping operation is performed to predict the current string.

In an embodiment, the processing circuitry can determine that the flipping operation is prohibited for the current string based on a string length of the current string being less than a second threshold. The string length of the current string can correspond to a number of samples in the current string.

In an embodiment, the processing circuitry can determine that the flipping operation is prohibited for the current string based on the current string having a rectangular shape.

In an embodiment, the current string has a rectangular shape and includes a sample that is not predicted using the flipping operation. The processing circuitry can determine that the flipping operation is performed to predict a plurality of samples in the current string that are different from the sample that is not predicted using the flipping operation. In an example, the current string is the current block.

In an embodiment, the processing circuitry can dequantize transform coefficients, and inversely transform the transform coefficients into residues of the current block.

Aspects of the disclosure also provide non-transitory computer-readable mediums storing instructions which when executed by a computer for video decoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIGS. 12A-12D show examples of intra block copy (IBC) according to an embodiment of the disclosure.

DETAILED DESCRIPTION OF EMBODIMENTS

Figure 3:
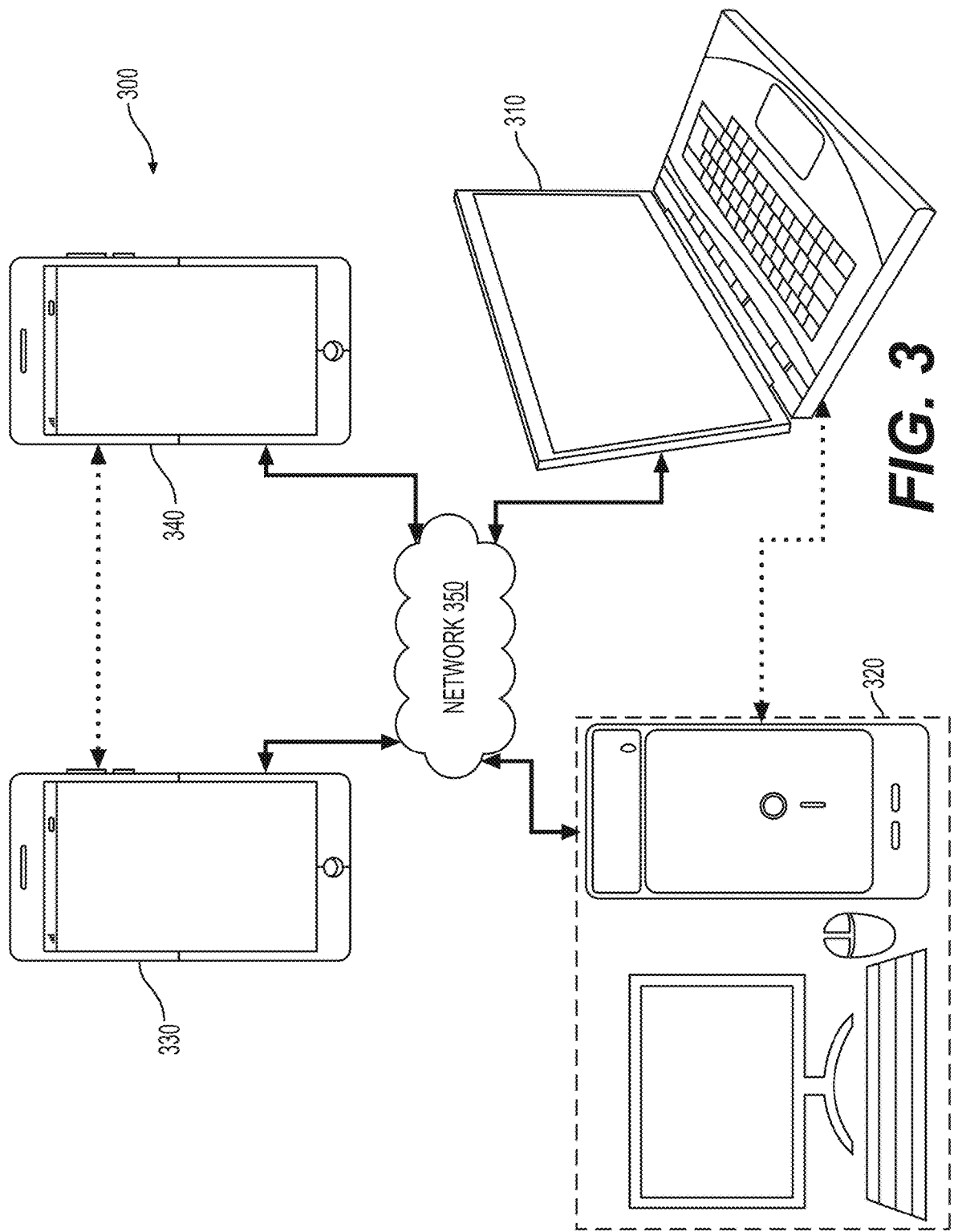
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
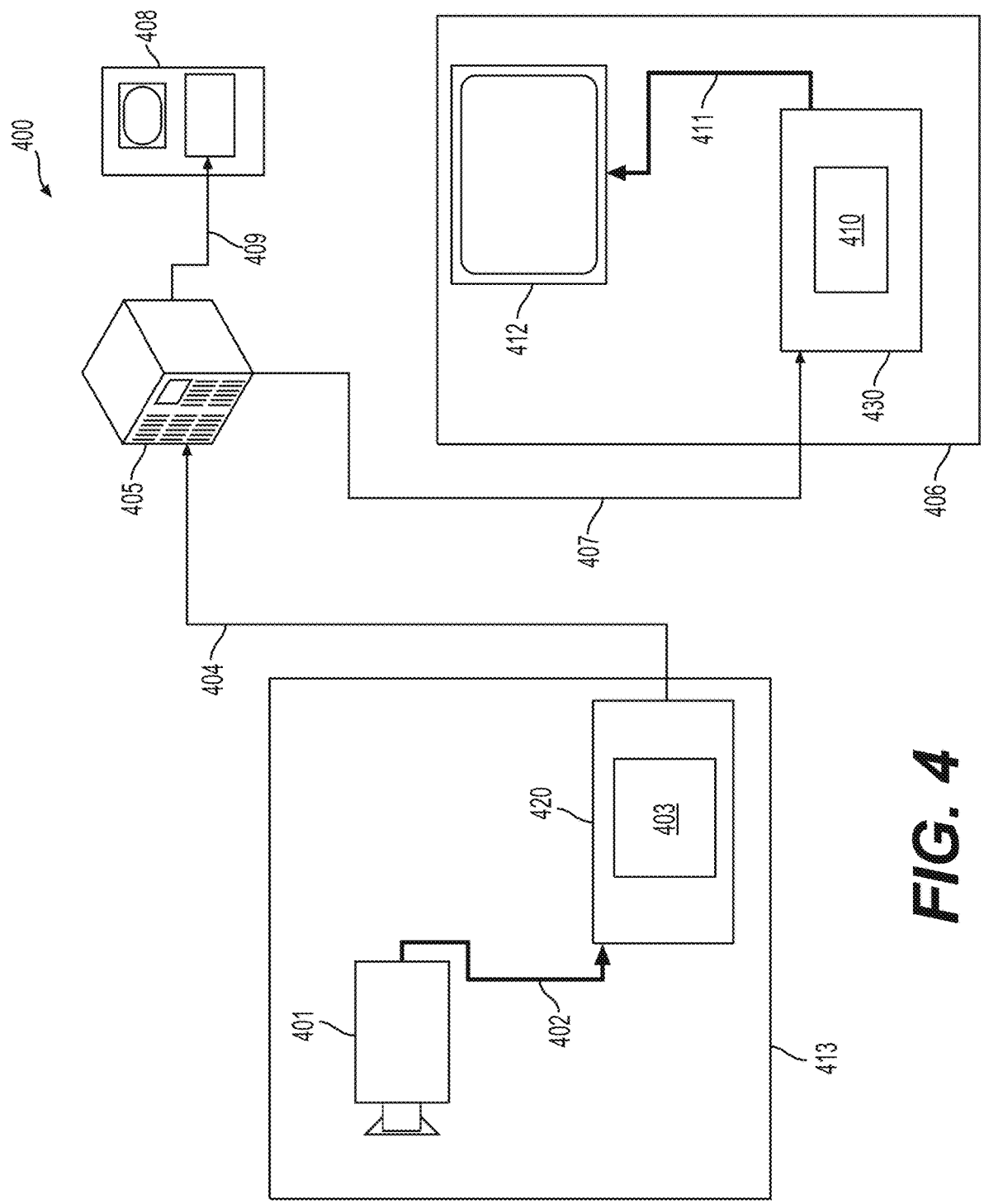
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
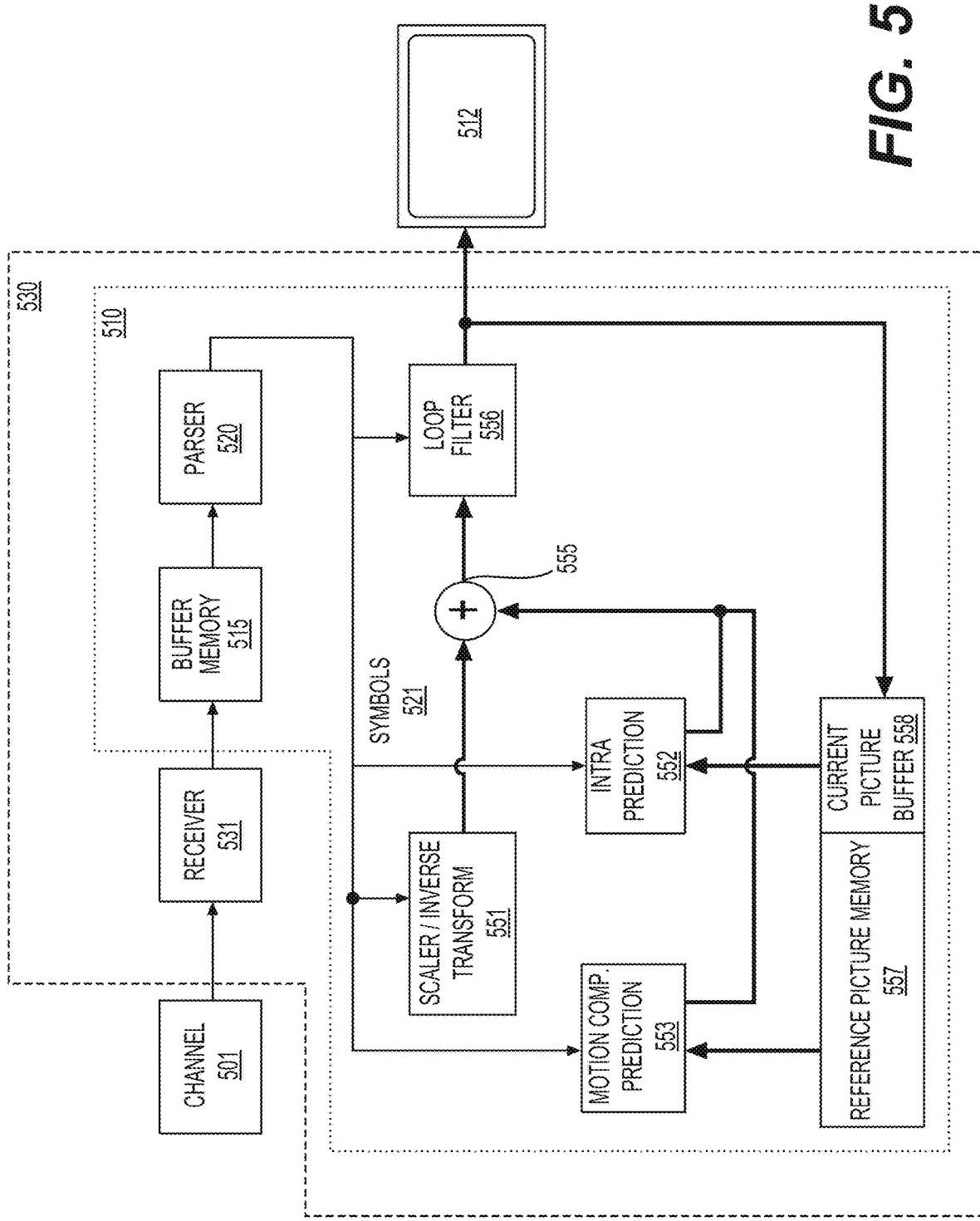
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
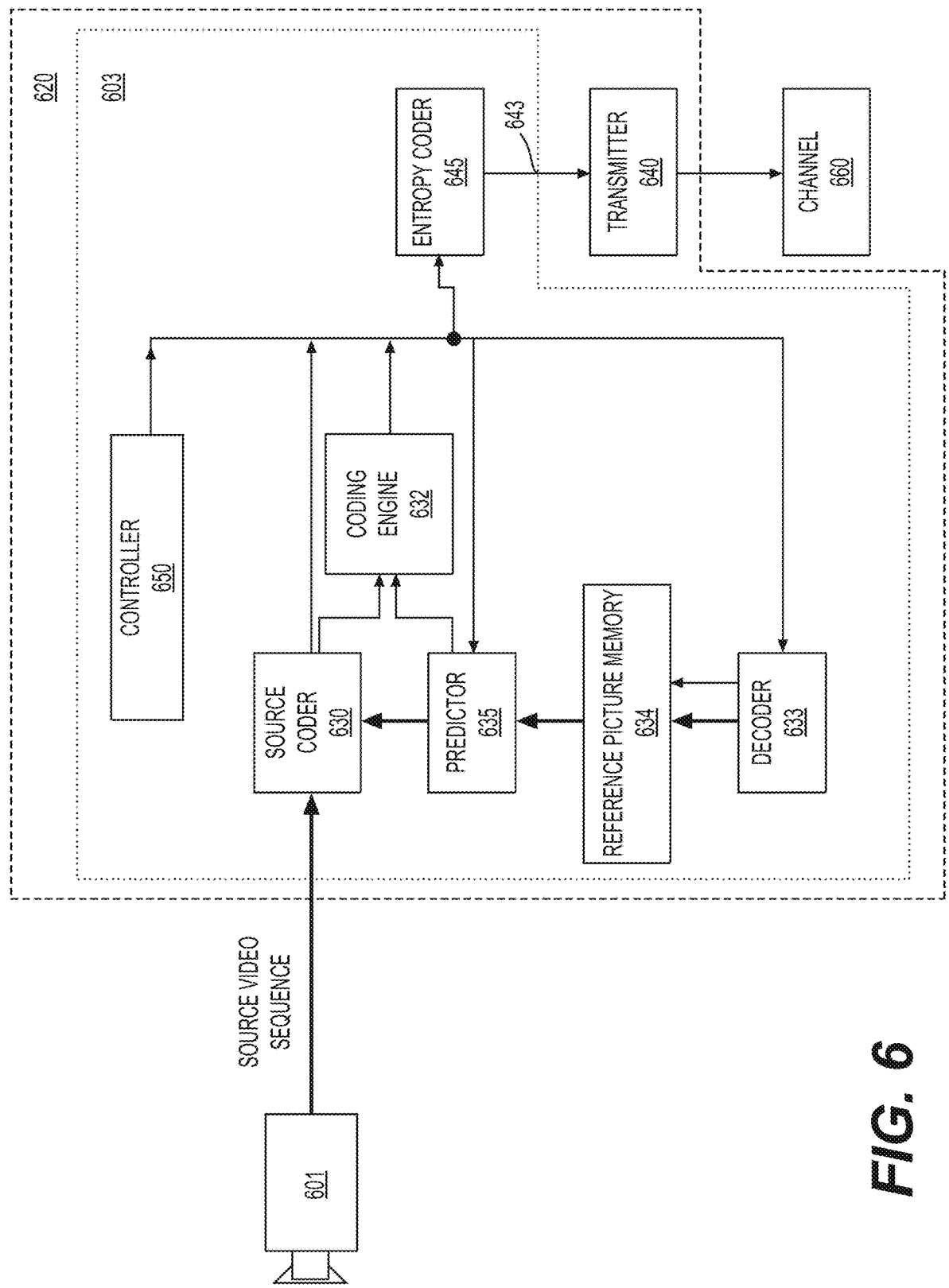
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
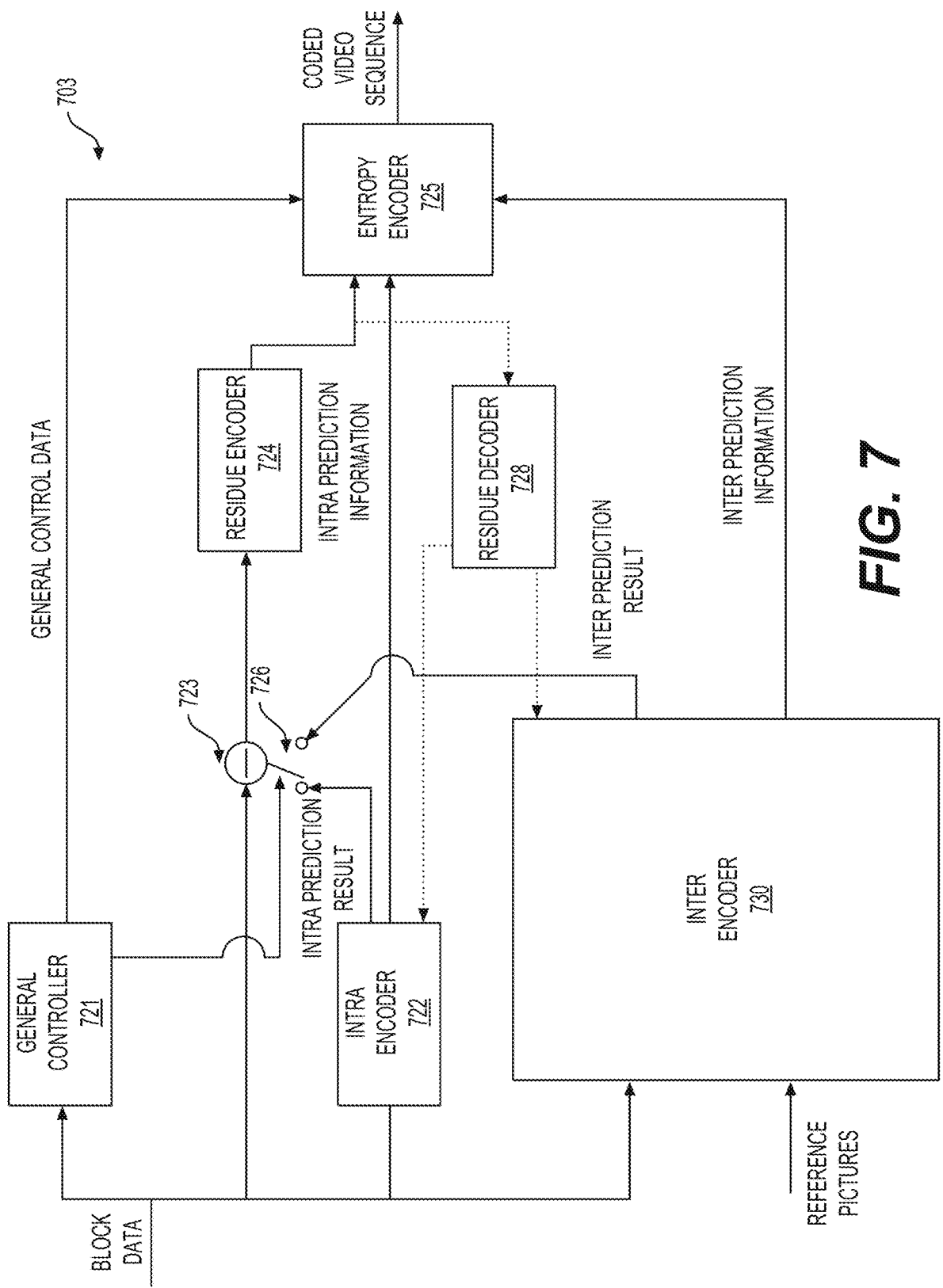
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
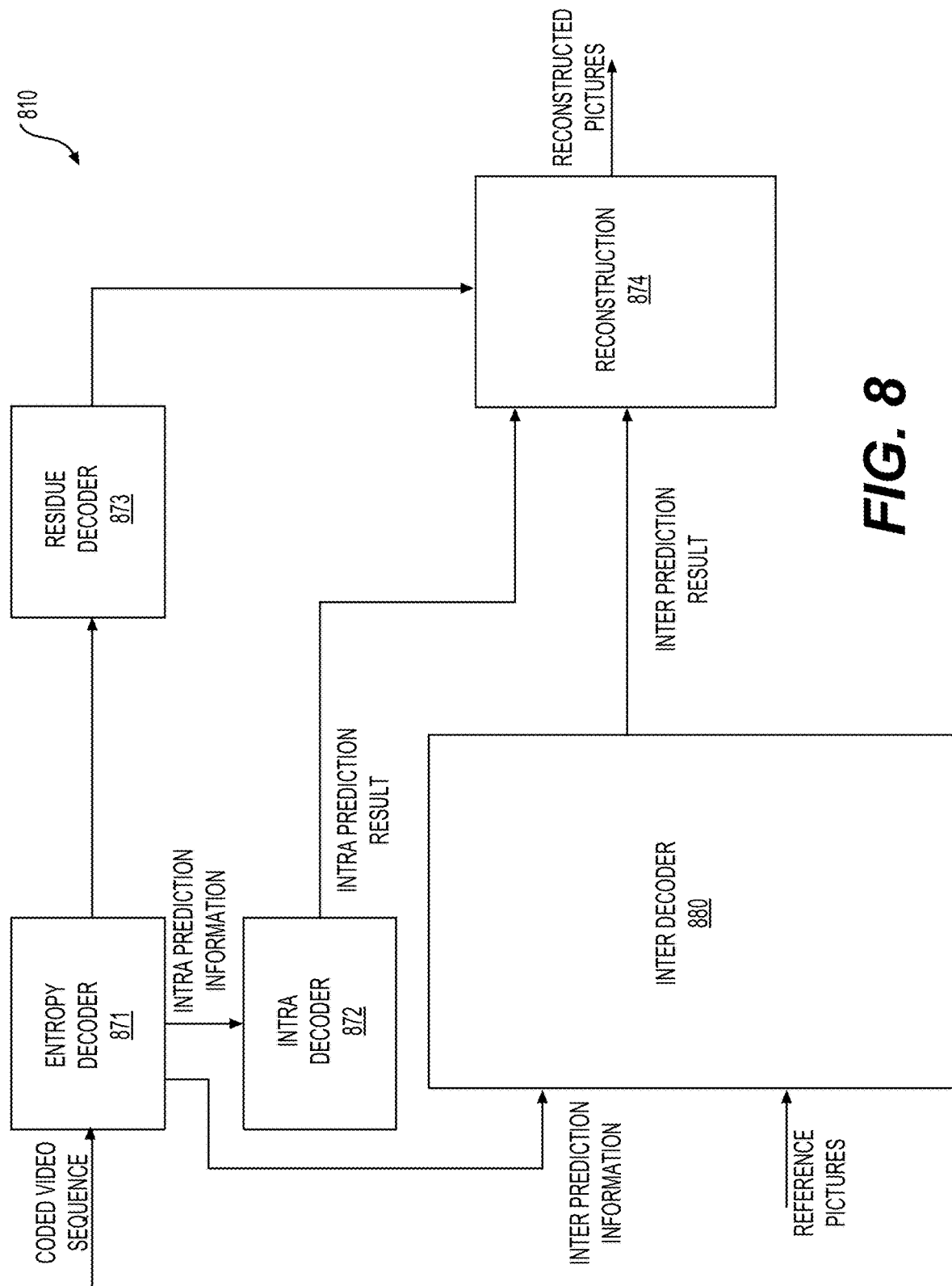
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques for performing string matching with flipping operations.

Block based compensation can be used for inter prediction and intra prediction. For the inter prediction, block based compensation from a different picture is known as motion compensation. Block based compensation can also be performed from a previously reconstructed area within the same picture, such as in intra prediction. The block based compensation from the reconstructed area within the same picture can be referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can be at any value (positive or negative, at either an x or a y direction), a BV has a few constraints to ensure that the reference block is available and already reconstructed. Also, in some examples, for parallel processing consideration, some reference areas such as a tile boundary, slice boundary, and/or wavefront ladder shape boundary is excluded.

The coding of a block vector could be either explicit or implicit. In the explicit mode, a BV difference between a block vector and its predictor is signaled. In the implicit mode, the block vector is recovered from a predictor (referred to as block vector predictor) without using the BV difference, in a similar way as a motion vector in the merge mode. The explicit mode can be referred to as a non-merge BV prediction mode. The implicit mode can be referred to as a merge BV prediction mode.

The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly. In some examples, the use of intra block copy at a block level can be signaled using a reference index approach. The current picture under decoding is then treated as a reference picture or a special reference picture. In an example, such a reference picture is put in the last position of a list of reference pictures. The special reference picture is also managed together with other temporal reference pictures in a buffer, such as a decoded picture buffer (DPB).

Figure 1A:
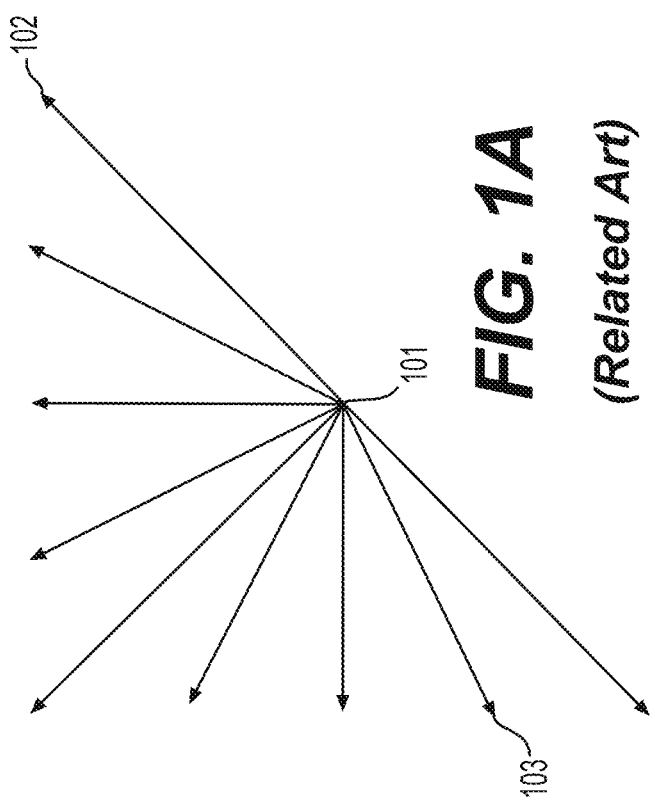
FIG. 1A is a schematic illustration of an exemplary subset of intra prediction modes.
Figure 1B:
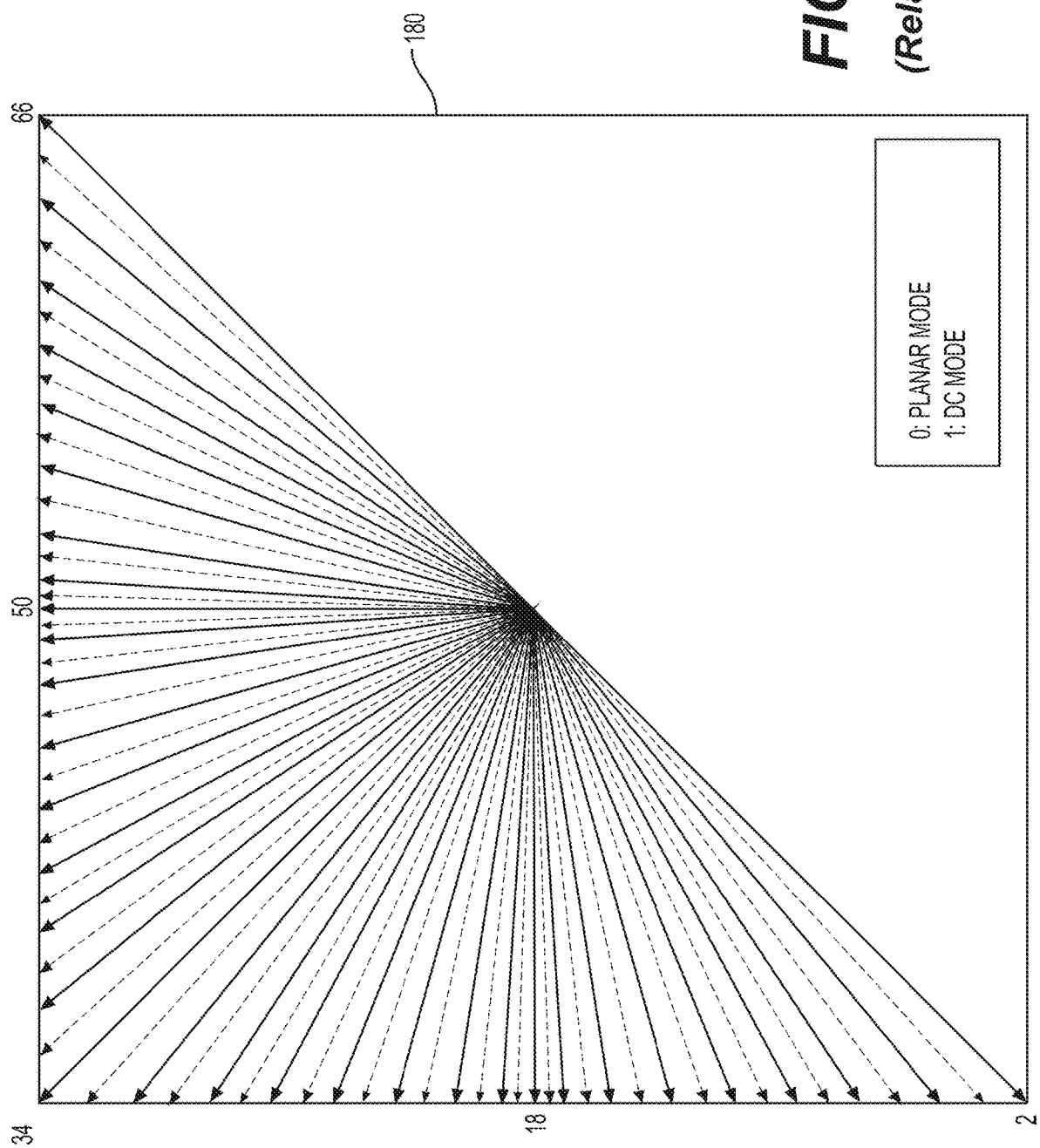
FIG. 1B is an illustration of exemplary intra prediction directions.
Figure 2:
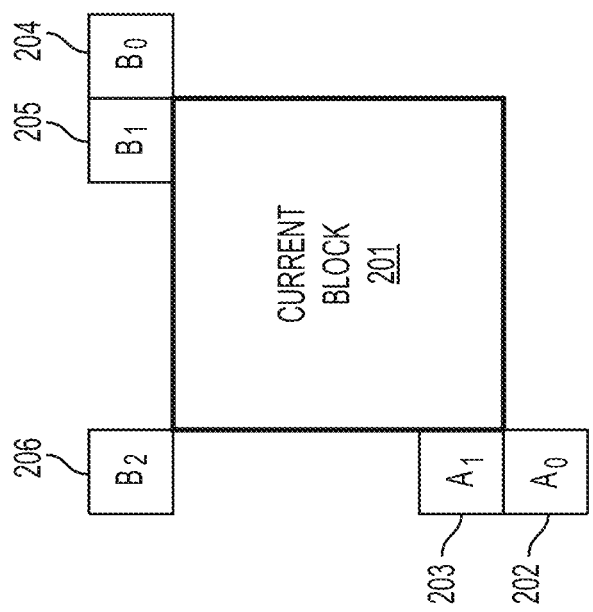
FIG. 2 is a schematic illustration of a current block and its surrounding spatial merge candidates in one example.

There can be variations for the IBC mode. In an example, the IBC mode is treated as a third mode that is different from the intra prediction mode and the inter prediction mode. Accordingly, the BV prediction in the implicit mode (or the merge mode) and the explicit mode are separated from the regular inter mode. A separate merge candidate list can be defined for the IBC mode where entries in the separate merge candidate list are BVs. Similarly, in an example, a BV prediction candidate list in the IBC explicit mode only includes BVs. General rules applied to the two lists (i.e., the separate merge candidate list and the BV prediction candidate list) are that the two lists may follow the same logic as a merge candidate list used in the regular merge mode or an AMVP predictor list used in the regular AMVP mode in terms of the candidate derivation process. For example, the five spatial neighboring locations (e.g., A0, A1, and B0, B1, B2 in FIG. 2), for example, HEVC or VVC inter merge mode are accessed for the IBC mode to derive the separate merge candidate list for the IBC mode.

As described above, a BV of a current block under reconstruction in a picture can have certain constraints, and thus, a reference block for the current block is within a search range. The search range refers to a part of the picture from which the reference block can be selected. For example, the search range may be within certain portions of a reconstructed area in the picture. A size, a position, a shape, and/or the like of the search range can be constrained. Alternatively, the BV can be constrained. In an example, the BV is a two-dimensional vector including an x and a y component, and at least one of the x and y components can be constrained. Constraints can be specified with respect to the BV, the search range, or a combination of the BV and the search range. In various examples, when certain constraints are specified with respect to the BV, the search range is constrained accordingly. Similarly, when certain constraints are specified with respect to the search range, the BV is constrained accordingly.

Figure 9:
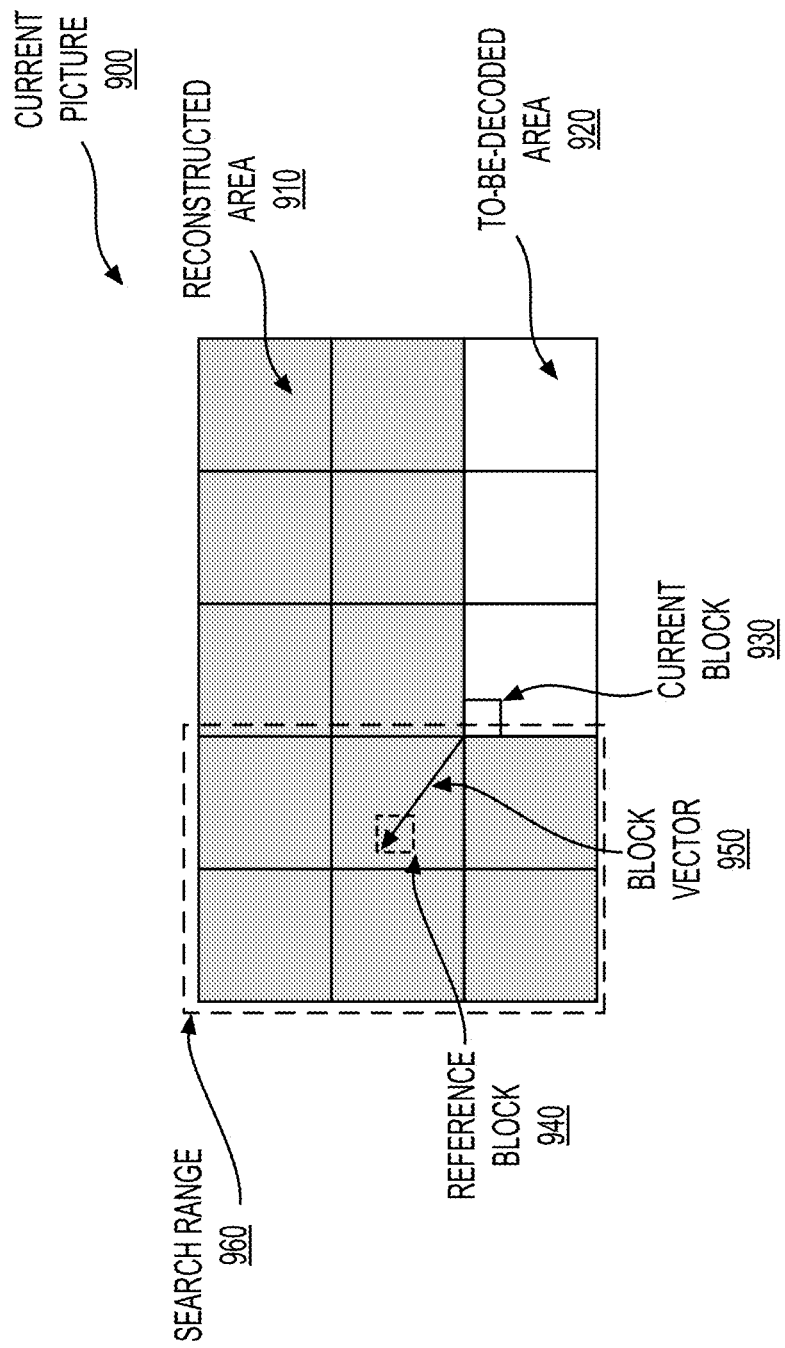
FIG. 9 shows an example of intra block copy according to an embodiment of the disclosure.

FIG. 9 shows an example of intra block copy according to an embodiment of the disclosure. A current picture (900) is to be reconstructed under decoding. The current picture (900) includes a reconstructed area (910) (gray area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a block vector (950) (or BV (950)). In the FIG. 9 example, a search range (960) is within the reconstructed area (910), the reference block (940) is within the search range (960), and the block vector (950) is constrained to point to the reference block (940) within the search range (960).

Various constraints can be applied to a BV and/or a search range. In an embodiment, a search range for a current block under reconstruction in a current CTB is constrained to be within the current CTB.

In an embodiment, an effective memory requirement to store reference samples to be used in intra block copy is one CTB size. In an example, the CTB size is 128×128 samples.

A current CTB includes a current region under reconstruction. The current region has a size of 64×64 samples. Since a reference memory can also store reconstructed samples in the current region, the reference memory can store 3 more regions of 64×64 samples when a reference memory size is equal to the CTB size of 128×128 samples. Accordingly, a search range can include certain parts of a previously reconstructed CTB while a total memory requirement for storing reference samples is unchanged (such as 1 CTB size of 128×128 samples or 4 64×64 reference samples in total). In an example, the previously reconstructed CTB is a left neighbor of the current CTB, such as shown in FIG. 10.

Figure 10:
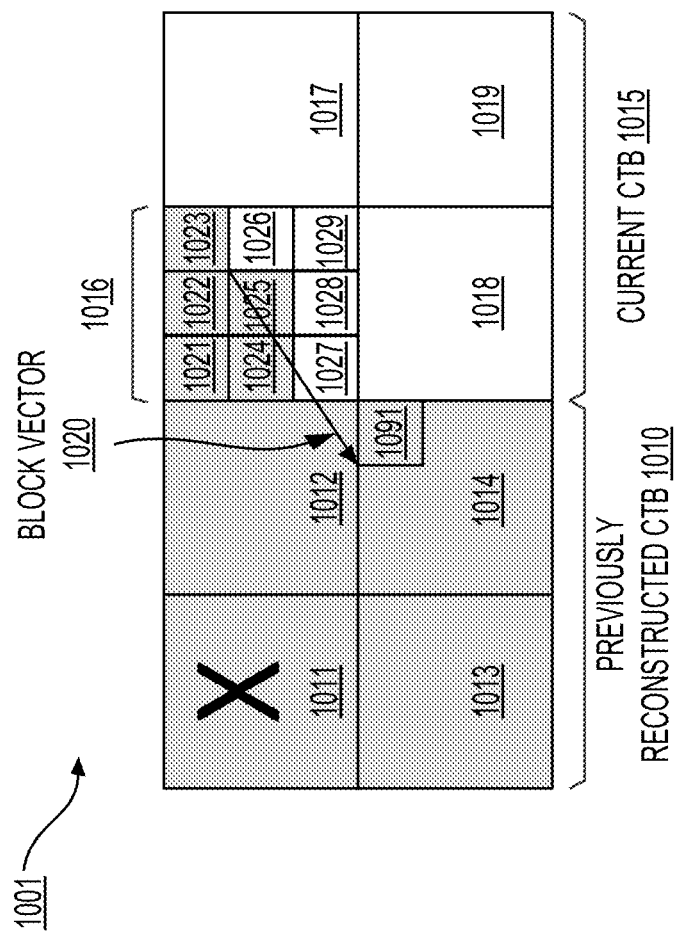
FIG. 10 shows an example of intra block copy according to an embodiment of the disclosure.

FIG. 10 shows an example of intra block copy according to an embodiment of the disclosure. A current picture (1001) includes a current CTB (1015) under reconstruction and a previously reconstructed CTB (1010) that is a left neighbor of the current CTB (1015). CTBs in the current picture (1001) have a CTB size, such as 128×128 samples, and a CTB width, such as 128 samples. The current CTB (1015) includes 4 regions (1016)-(1019), where the current region (1016) is under reconstruction. The current region (1016) includes a plurality of coding blocks (1021)-(1029). Similarly, the previously reconstructed CTB (1010) includes 4 regions (1011)-(1014). The coding blocks (1021)-(1025) are already reconstructed, the current block (1026) is under reconstruction, and the coding blocks (1026)-(1027) and the regions (1017)-(1019) are to be reconstructed.

The current region (1016) has a collocated region (i.e., the region (1011), in the previously reconstructed CTB (1010)). A relative position of the collocated region (1011) with respect to the previously reconstructed CTB (1010) can be identical to a relative position of the current region (1016) with respect to the current CTB (1015). In the example illustrated in FIG. 10, the current region (1016) is a top left region in the current CTB (1015), and thus, the collocated region (1011) is also a top left region in the previously reconstructed CTB (1010). Since a position of the previously reconstructed CTB (1010) is offset from a position of the current CTB (1015) by the CTB width, a position of the collocated region (1011) is offset from a position of the current region (1016) by the CTB width.

In an embodiment, a collocated region of the current region (1016) is in a previously reconstructed CTB where a position of the previously reconstructed CTB is offset by one or multiples of the CTB width from the positon of the current CTB (1015), and thus, a position of the collocated region is also offset by a corresponding one or multiples of the CTB width from the position of the current region (1016). The position of the collocated region can be left shifted, up shifted, or the like from the current region (1016).

As described above, a size of a search range for the current block (1026) is constrained by the CTB size. In the FIG. 10 example, the search range can include the regions (1012)-(1014) in the previously reconstructed CTB (1010) and a portion of the current region (1016) that is already reconstructed, such as the coding blocks (1021)-(1025). The search range further excludes the collocated region (1011) so that the size of the search range is within the CTB size. Referring to FIG. 10, a reference block (1091) is located in the region (1014) of the previously reconstructed CTB (1010). A block vector (1020) indicates an offset between the current block (1026) and the respective reference block (1091). The reference block (1091) is in the search range.

The example illustrated in FIG. 10 can be suitably adapted to other scenarios where a current region is located at another location in the current CTB (1015). In an example, when a current block is in the region (1017), a collocated region for the current block is the region (1012). Therefore, a search range can include the regions (1013)-(1014), the region (1016), and a portion of the region (1017) that is already reconstructed. The search range further excludes the region (1011) and the collocated region (1012) so that the size of the search range is within the CTB size. In an example, when a current block is in the region (1018), a collocated region for the current block is the region (1013). Therefore, a search range can include the region (1014), the regions (1016)-(1017), and a portion of the region (1018) that is already reconstructed. The search range further excludes the regions (1011)-(1012) and the collocated region (1013) so that the size of the search range is within the CTB size. In an example, when a current block is in the region (1019), a collocated region for the current block is the region (1014). Therefore, a search range can include the regions (1016)-(1018), and a portion of the region (1019) that is already reconstructed. The search range further excludes the previously reconstructed CTB (1010) so that the size of the search range is within the CTB size.

In the above description, a reference block can be in the previously reconstructed CTB (1010) or the current CTB (1015).

Figure 11:
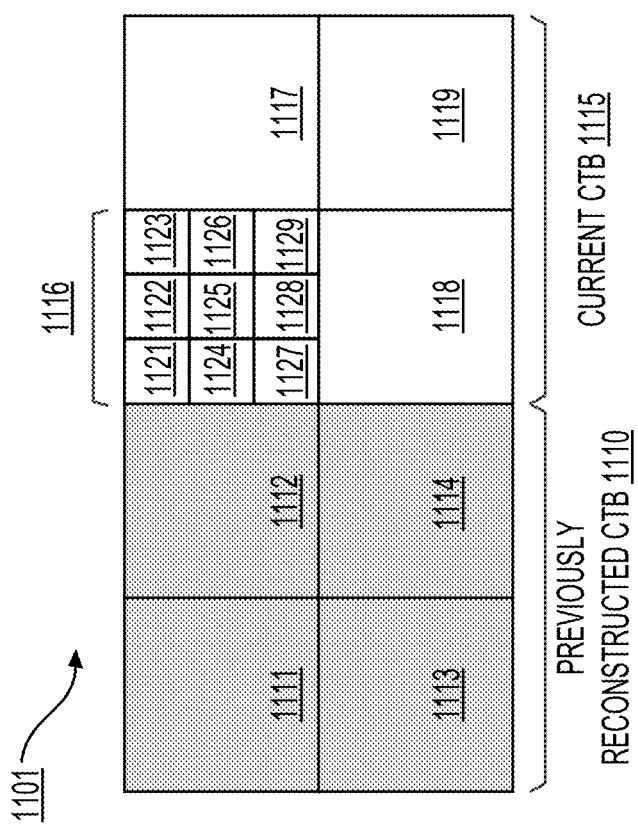
FIG. 11 shows an example of intra block copy according to an embodiment of the disclosure.

FIG. 11 shows an example of intra block copy according to an embodiment of the disclosure. A current picture (1101) includes a current CTB (1115) under reconstruction and a previously reconstructed CTB (1110) that is a left neighbor of the current CTB (1115). CTBs in the current picture (1101) have a CTB size and a CTB width. The current CTB (1115) includes 4 regions (1116)-(1119) where the current region (1116) is under reconstruction. The current region (1116) includes a plurality of coding blocks (1121)-(1129). Similarly, the previously reconstructed CTB (1110) includes 4 regions (1111)-(1114). The current block (1121) under reconstruction is to be reconstructed first in the current region (1116) and the coding blocks (1122)-(1129) are to be reconstructed. In an example, the CTB size is 128×128 samples, each of the regions (1111)-(1114) and (1116)-(1119) is 64×64 samples. A reference memory size is equal to the CTB size and is 128×128 samples, and thus, the search range, when bounded by the reference memory size, includes 3 regions and a portion of an additional region.

Similarly as described with reference to FIG. 10, the current region (1116) has a collocated region (i.e., the region (1111) in the previously reconstructed CTB (1110)). A reference block for the current block (1121) can be in the region (1111), and thus, a search range can include the regions (1111)-(1114). For example, when the reference block is in the region (1111), a collocated region of the reference block is the region (1116), where no samples in the region (1116) have been reconstructed prior to the reconstruction of the current block (1121). However, as described with reference to FIG. 10, for example, after the reconstruction of the coding block (1121), the region (1111) is no longer available to be included in a search range for reconstructing the coding block (1122). Therefore, a tight synchronization and timing control of the reference memory buffer is to be used and can be challenging.

According to some embodiments, when a current block is to be reconstructed first in a current region of a current CTB, a search range can exclude a collocated region of the current region that is in a previously reconstructed CTB where the current CTB and the previously reconstructed CTB are in a same current picture. A block vector can be determined such that a reference block is in the search range that excludes the collocated region in the previously reconstructed CTB. In an embodiment, the search range includes coding blocks that are reconstructed after the collocated region and before the current block in a decoding order.

In the descriptions below, a CTB size can vary and a maximum CTB size is set to be identical to a reference memory size. In an example, the reference memory size or the maximum CTB size is 128×128 samples. The descriptions can be suitably adapted to other reference memory sizes or maximum CTB sizes.

In an embodiment, the CTB size is equal to the reference memory size. The previously reconstructed CTB is a left neighbor of the current CTB, a position of the collocated region is offset by a CTB width from a position of the current region, and the coding blocks in the search range are in at least one of: the current CTB and the previously reconstructed CTB.

FIGS. 12A-12D show examples of intra block copy according to an embodiment of the disclosure. Referring to FIGS. 12A-D, a current picture (1201) includes a current CTB (1215) under reconstruction and a previously reconstructed CTB (1210) that is a left neighbor of the current CTB (1215). CTBs in the current picture (1201) have a CTB size and a CTB width. The current CTB (1215) includes 4 regions (1216)-(1219). Similarly, the previously reconstructed CTB (1210) includes 4 regions (1211)-(1214). In an embodiment, the CTB size is a maximum CTB size and is equal to a reference memory size. In an example, the CTB size and the reference memory size are 128×128 samples, and thus, each of the regions (1211)-(1214) and (1216)-(1219) has a size of 64×64 samples.

In the examples illustrated in FIGS. 12A-12D, the current CTB (1215) includes a top left region, a top right region, a bottom left region, and a bottom right region that correspond to the regions (1216)-(1219), respectively. The previously reconstructed CTB (1210) includes a top left region, a top right region, a bottom left region, and a bottom right region that correspond to the regions (1211)-(1214), respectively.

Figure 12A:
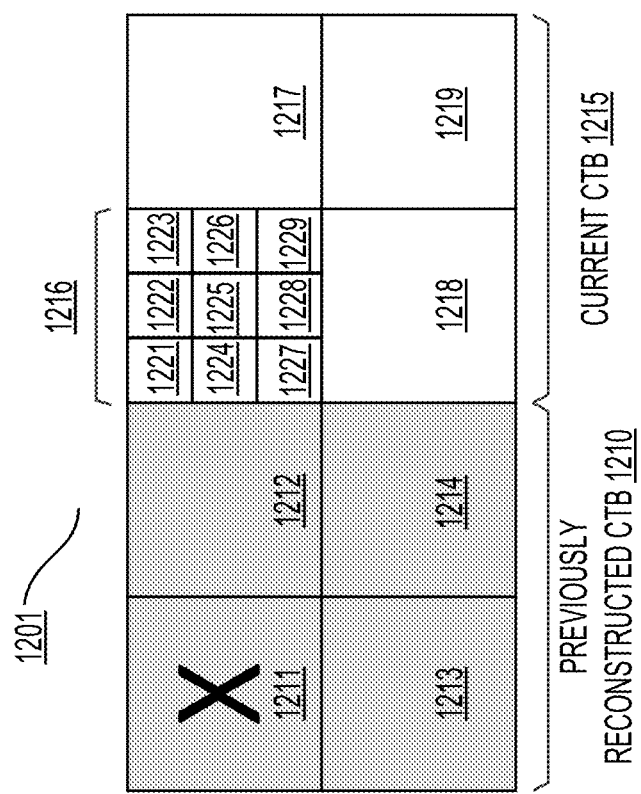

Referring to FIG. 12A, the current region (1216) is under reconstruction. The current region (1216) can include a plurality of coding blocks (1221)-(1229). The current region (1216) has a collocated region, i.e., the region (1211), in the previously reconstructed CTB (1210). A search range for one of the coding blocks (1221)-(1229) to be reconstructed can exclude the collocated region (1211). The search range can include the regions (1212)-(1214) of the previously reconstructed CTB (1210) that are reconstructed after the collocated region (1211) and before the current region (1216) in a decoding order.

Referring to FIG. 12A, a position of the collocated region (1211) is offset by the CTB width, such as 128 samples, from a position of the current region (1216). For example, the position of the collocated region (1211) is left shifted by 128 samples from the position of the current region (1216).

Referring again to FIG. 12A, when the current region (1216) is the top left region of the current CTB (1215), the collocated region (1211) is the top left region of the previously reconstructed CTB (1210), and the search region excludes the top left region of the previously reconstructed CTB.

Figure 12B:
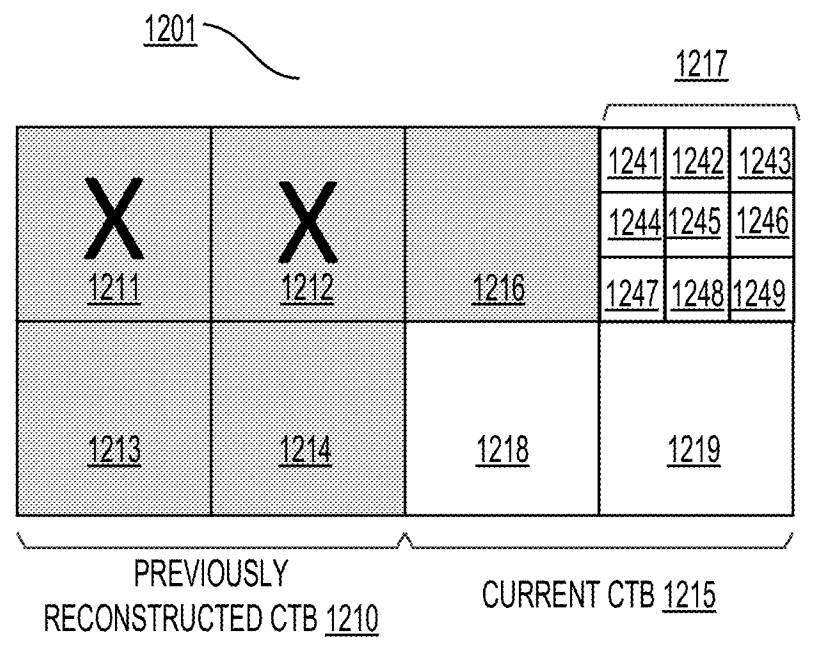

Referring to FIG. 12B, the current region (1217) is under reconstruction. The current region (1217) can include a plurality of coding blocks (1241)-(1249). The current region (1217) has a collocated region (i.e., the region (1212), in the previously reconstructed CTB (1210)). A search range for one of the plurality of coding blocks (1241)-(1249) can exclude the collocated region (1212). The search range includes the regions (1213)-(1214) of the previously reconstructed CTB (1210) and the region (1216) in the current CTB (1215) that are reconstructed after the collocated region (1212) and before the current region (1217). The search range further excludes the region (1211) due to constraint of the reference memory size (i.e., one CTB size). Similarly, a position of the collocated region (1212) is offset by the CTB width, such as 128 samples, from a position of the current region (1217).

In the FIG. 12B example, the current region (1217) is the top right region of the current CTB (1215), the collocated region (1212) is also the top right region of the previously reconstructed CTB (1210), and the search region excludes the top right region of the previously reconstructed CTB (1210).

Figure 12C:
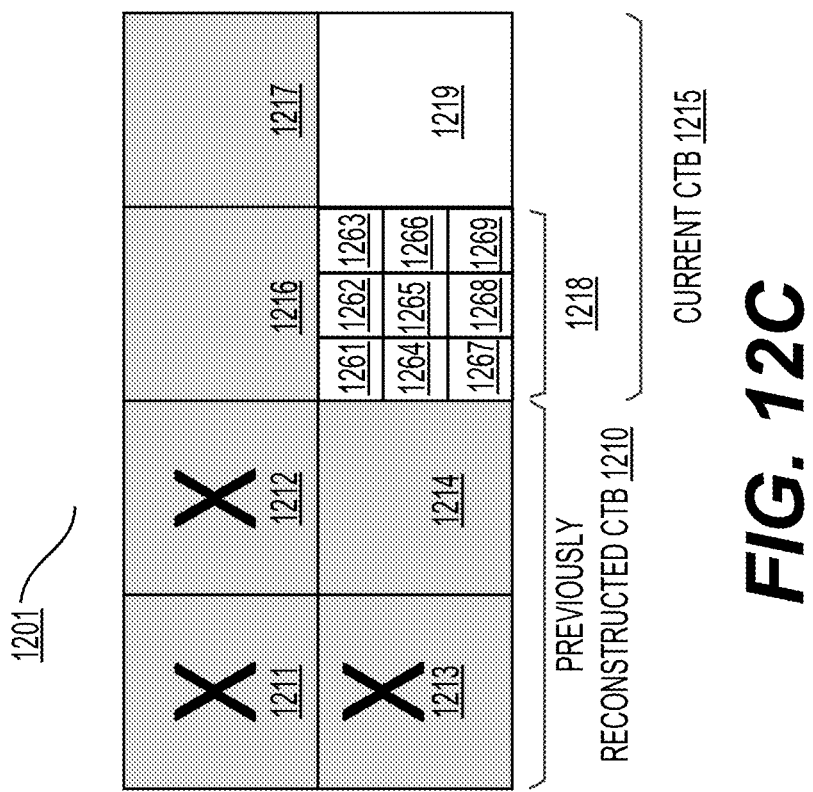

Referring to FIG. 12C, the current region (1218) is under reconstruction. The current region (1218) can include a plurality of coding blocks (1261)-(1269). The current region (1218) has a collocated region (i.e., the region (1213)), in the previously reconstructed CTB (1210). A search range for one of the plurality of coding blocks (1261)-(1269) can exclude the collocated region (1213). The search range includes the region (1214) of the previously reconstructed CTB (1210) and the regions (1216)-(1217) in the current CTB (1215) that are reconstructed after the collocated region (1213) and before the current region (1218). Similarly, the search range further excludes the regions (1211)-(1212) due to constraint of the reference memory size. A position of the collocated region (1213) is offset by the CTB width, such as 128 samples, from a position of the current region (1218). In the FIG. 12C example, when the current region (1218) is the bottom left region of the current CTB (1215), the collocated region (1213) is also the bottom left region of the previously reconstructed CTB (1210), and the search region excludes the bottom left region of the previously reconstructed CTB (1210).

Figure 12D:
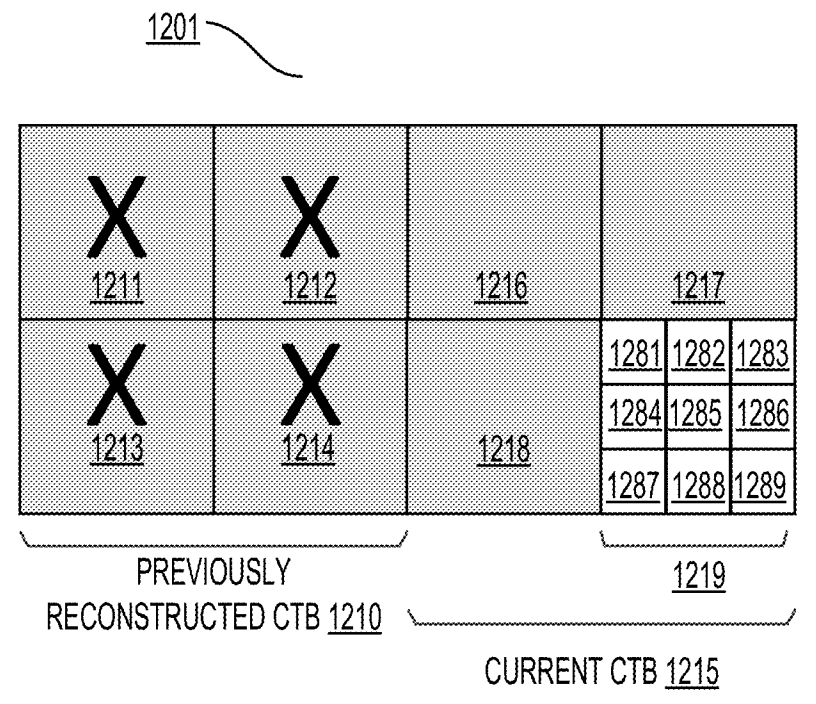

Referring to FIG. 12D, the current region (1219) is under reconstruction. The current region (1219) can include a plurality of coding blocks (1281)-(1289). The current region (1219) has a collocated region (i.e., the region (1214)), in the previously reconstructed CTB (1210). A search range for one of the plurality of coding blocks (1281)-(1289) can exclude the collocated region (1214). The search range includes the regions (1216)-(1218) in the current CTB (1215) that are reconstructed after the collocated region (1214) and before the current region (1219) in a decoding order. The search range excludes the regions (1211)-(1213) due to constraint of the reference memory size, and thus, the search range excludes the previously reconstructed CTB (1210). Similarly, a position of the collocated region (1214) is offset by the CTB width, such as 128 samples, from a position of the current region (1219). In the FIG. 12D example, when the current region (1219) is the bottom right region of the current CTB (1215), the collocated region (1214) is also the bottom right region of the previously reconstructed CTB (1210) and the search region excludes the bottom right region of the previously reconstructed CTB (1210).

Referring back to FIG. 2, the MVs associated with the five positions, denoted A0, A1, and B0, B1, B2 (202 through 206, respectively), can be referred to as spatial merge candidates. A candidate list (e.g., a merge candidate list) can be formed based on the spatial merge candidates. Any suitable order can be used to form the candidate list from the positions. In an example, the order can be A0, B0, B1, A1, and B2 where A0 is the first and B2 is the last. In an example, the order can be A1, B1, B0, A0, and B2 where A1 is the first and B2 is the last.

According to some embodiments, motion information of previously coded blocks for a current block (e.g., a coding block (CB) or a current CU) can be stored in a history-based motion vector prediction (HMVP) buffer (e.g., a table) to provide motion vector prediction (MVP) candidates (also referred to as HMVP candidates) for the current block. The HMVP buffer may include one or more HMVP candidates, and can be maintained during an encoding/a decoding process. In an example, a HMVP candidate in the HMVP buffer corresponds to the motion information of a previously coded block. The HMVP buffer can be used in any suitable encoder and/or decoder. HMVP candidate(s) can be added to a merge candidate list after spatial MVP(s) and TMVP(s).

The HMVP buffer can be reset (e.g., emptied) when a new CTU (or a new CTB) row is encountered. When there is a non-subblock inter-coded block, the associated motion information can be added to a last entry of the HMVP buffer as a new HMVP candidate.

In an example, such as in VTM3, a buffer size (denoted by S) of the HMVP buffer is set to be 6, indicating that up to 6 HMVP candidates may be added to the HMVP buffer. In some embodiments, the HMVP buffer may operate in a first-in-first-out (FIFO) rule, and thus, a piece of motion information (or a HMVP candidate) that is stored first in the HMVP buffer is the first to be removed from the HMVP buffer, for example, when the HMVP buffer is full. When inserting a new HMVP candidate to the HMVP buffer, a constrained FIFO rule can be utilized where a redundancy check is first applied to determine whether an identical or similar HMVP candidate is in the HMVP buffer. If an identical or similar HMVP candidate is determined to be in the HMVP buffer, the identical or similar HMVP candidate can be removed from the HMVP buffer and remaining HMVP candidates can be moved forward in the HMVP buffer.

The HMVP candidates can be used in a merge candidate list construction process, for example, in a merge mode. The most recent stored HMVP candidate(s) in the HMVP buffer can be checked in an order and inserted to the merge candidate list after the TMVP candidate(s). A redundancy check can be applied to the HMVP candidates with respect to the spatial or temporal merge candidates that are in the merge candidate list. The descriptions can be suitably adapted to an AMVP mode to construct an AMVP candidate list.

To reduce a number of redundancy check operations, the following simplifications can be used.

(i) A number of HMVP candidates used for generating the merge candidate list can be set as (N<=4)?M: (8−N). N indicates a number of existing candidates in the merge candidate list and M indicates a number of available HMVP candidate(s) in the HMVP buffer. When the number of existing candidates (N) in the merge candidate list is less than or equal to 4, the number of HMVP candidates used for generating the merge candidate list equals to M. Otherwise, the number of HMVP candidates used for generating the merge candidate list equals to (8−N).

(ii) When the total number of available merge candidates reaches the maximum allowed merge candidates minus 1, the merge candidate list construction process from the HMVP buffer is terminated.

When the IBC mode operates as a separate mode from the inter prediction mode, a simplified BV derivation process for the IBC mode can be used. A history-based block vector prediction buffer (referred as a HBVP buffer) can be used to perform BV prediction. The HBVP buffer can be used for storing BV information (e.g., BVs) of previously coded blocks of a current block (e.g., a CB or a CU) in a current picture. In an example, the HBVP buffer is a separate history buffer from other buffer(s), such as a HMVP buffer. The HBVP buffer can be a table.

The HBVP buffer can provide BV predictor (BVP) candidates (also referred to as HBVP candidates) for the current block. The HBVP buffer (e.g., the table) may include one or more HBVP candidates, and can be maintained during an encoding/a decoding process. In an example, a HBVP candidate in the HBVP buffer corresponds to the BV information of a previously coded block in the current picture. The HBVP buffer can be used in any suitable encoder and/or decoder. HBVP candidate(s) can be added to a merge candidate list configured for BV prediction after BV(s) of spatial neighboring block(s) of the current block. The merge candidate list configured for BV prediction can be used for the merge BV prediction mode and/or the non-merge BV prediction mode.

The HBVP buffer can be reset (e.g., emptied) when a new CTU (or a new CTB) row is encountered.

In an example, such as in VVC, a buffer size of the HBVP buffer is set to be 6, indicating that up to 6 HBVP candidates may be added to the HBVP buffer. In some embodiments, the HBVP buffer may operate in the FIFO rule, and thus, a piece of BV information (or a HBVP candidate) that is stored first in the HBVP buffer is the first to be removed from the HBVP buffer, for example, when the HBVP buffer is full. When inserting a new HBVP candidate into the HBVP buffer, a constrained FIFO rule can be utilized where a redundancy check is first applied to determine whether an identical or similar HBVP candidate is in the HBVP buffer. If an identical or similar HBVP candidate is determined to be in the HBVP buffer, the identical or similar HBVP candidate can be removed from the HBVP buffer and remaining HBVP candidates can be moved forward in the HBVP buffer.

The HBVP candidates can be used in a merge candidate list construction process, for example, in the merge BV prediction mode. The most recent stored HBVP candidate(s) in the HBVP buffer can be checked in an order and inserted into the merge candidate list after the spatial candidate(s). A redundancy check can be applied to the HBVP candidates with respect to the spatial merge candidates that are in the merge candidate list.

In an embodiment, a HBVP buffer is established to store one or more pieces of BV information of one or more previously coded blocks coded in the IBC mode. The one or more pieces of BV information can include one or more BVs of the one or more previously coded blocks coded in the IBC mode. Further, each of the one or more pieces of BV information can include side information (or additional information) such as a block size, a block location, and/or the like of the respective previously coded block coded in the IBC mode.

In class-based history-based block vector prediction (also referred to as CBVP), for the current block, one or more pieces of BV information in the HBVP buffer that meet certain conditions can be classified into corresponding categories (also referred to as classes), and thus forming a CBVP buffer. In an example, each piece of BV information in the HBVP buffer is for a respective previously coded block, for example, coded with the IBC mode. The piece of BV information for the previously coded block can include a BV, a block size, a block position, and/or the like. The previously coded block has a block width, a block height, and a block area. The block area can be a multiplication of the block width and the block height. In an example, the block size is represented by the block area. The block position of the previously coded block can be represented by an upper left corner (e.g., an upper left corner of 4×4 area) or an upper left sample of the previously coded block.

Figure 13:
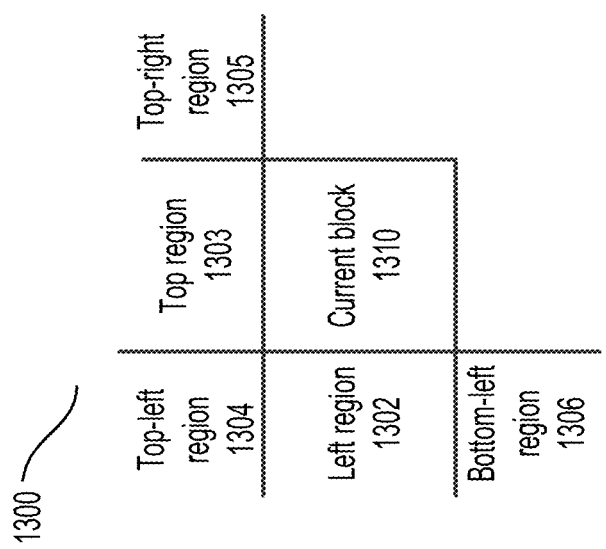
FIG. 13 shows an example of spatial classes for IBC block vector prediction for a current block according to an embodiment of the disclosure.

FIG. 13 shows an example of spatial classes for IBC BV prediction for a current block (e.g., a CB, a CU) (1310) according to an embodiment of the disclosure. A left region (1302) can be to the left of the current block (1310). BV information for previously coded block(s) having respective block position(s) in the left region (1302) can be referred to as left candidates or left BV candidates. A top region (1303) can be above the current block (1310). BV information for previously coded block(s) having respective block position(s) in the top region (1303) can be referred to as top candidates or top BV candidates. A top-left region (1304) can be to a top-left of the current block (1310). BV information for previously coded block(s) having respective block position(s) in the top-left region (1304) can be referred to as top-left candidates or top-left BV candidates. A top-right region (1305) can be to a top-right of the current block (1310). BV information for previously coded block(s) having respective block position(s) in the top-right region (1305) can be referred to as top-right candidates or top-right BV candidates. A bottom-left region (1306) can be to a bottom-left of the current block (1310). BV information for previously coded block(s) having respective block position(s) in the bottom-left region (1306) can be referred to as bottom-left candidates or bottom-left BV candidates. Other kinds of spatial classes can also be defined and used in the CBVP buffer.

If the BV information for the previously coded block meets the following conditions, the BV information can be classified into the corresponding categories (or classes).

(i) Class 0: the block size (e.g., the block area) is greater than or equal to a threshold (e.g., 64 pixels).

(ii) Class 1: an occurrence (or a frequency) of the BV is greater than or equal to 2.

The occurrence of the BV can refer to a number of times the BV is used to predict previously coded block(s). When a pruning process is used to form the CBVP buffer, the BV can be stored in one entry (instead of in multiples entries having the same BV) when the BV is used multiple times in predicting previously coded blocks. The occurrence of the BV can be recorded.

(iii) Class 2: the block position is in the left region (1302) where a portion (e.g., an upper left corner of 4×4 area) of the previously coded block is to the left of the current block (1310). The previously coded block can be within the left region (1302). Alternatively, the previously coded block can span across multiple regions including the left region (1302) where the block position is in the left region (1302).

(iv) Class 3: the block position is in the top region (1303) where a portion (e.g., the upper left corner of 4×4 area) of the previously coded block is above the current block (1310). The previously coded block can be within the top region (1303). Alternatively, the previously coded block can span across multiple regions including the top region (1303) where the block position is in the top region (1303).

(v) Class 4: the block position is in the top-left region (1304) where a portion (e.g., the upper left corner of 4×4 area) of the previously coded block is at the top-left side of the current block (1310). The previously coded block can be within the top-left region (1304). Alternatively, the previously coded block can span across multiple regions including the top-left region (1304) where the block position is in the top-left region (1304).

(vi) Class 5: the block position is in the top-right region (1305) where a portion (e.g., the upper left corner of 4×4 area) of the previously coded block is at the top-right side of the current block (1310). The previously coded block can be within the top-right region (1305). Alternatively, the previously coded block can span across multiple regions including the top-right region (1305) where the block position is in the top-right region (1305).

(vii) Class 6: the block position is in the bottom-left region (1306) where a portion (e.g., the upper left corner of 4×4 area) of the coded block is at the bottom-left side of the current block (1310). The previously coded block can be within the bottom-left region (1306). Alternatively, the previously coded block can span across multiple regions including the bottom-left region (1306) where the block position is in the bottom-left region (1306).

For each category (or class), the BV of the most recently coded block can be derived as the BVP candidate. The CBVP buffer can be constructed by appending the BV predictor(s) of each category in an order from Class 0 to Class 6. The above description for the CBVP can be suitably adapted to include less classes or additional classes not described above. One or more of the Classes 0-6 can be modified. In an example, each entry in the HBVP buffer is classified into one of the seven Classes 0-6. An index can be signaled to indicate which of the Classes 0-6 is chosen. At a decoder side, the first entry in the chosen class can be used to predict a BV for the current block.

Figure 14:
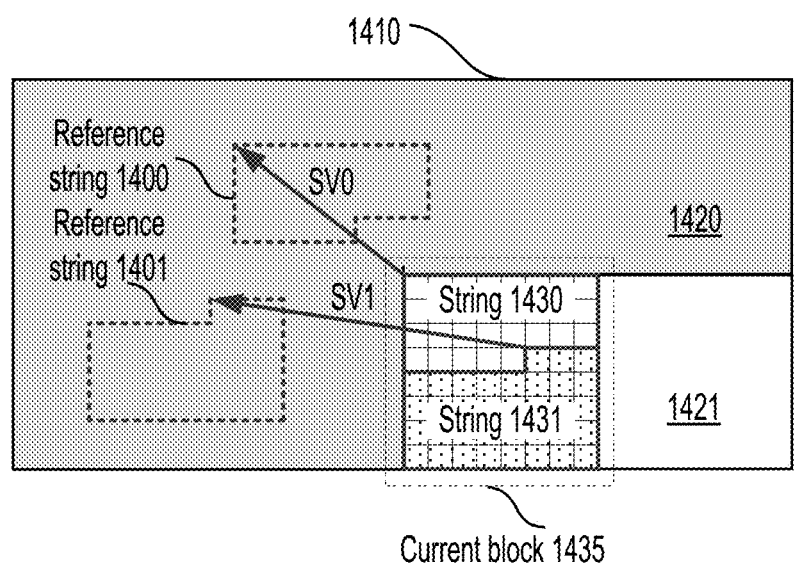
FIG. 14 shows an example of a string copy mode according to an embodiment of the disclosure.

FIG. 14 shows an example of a string copy mode according to an embodiment of the disclosure. The string copy mode can also be referred to as a string matching mode, an intra string copy mode, or string prediction. A current picture (1410) includes a reconstructed region (a gray area) (1420) and a region (1421) that is under reconstruction. A current block (1435) in the region (1421) is under reconstruction. The current block (1435) can be a CB, a CU, or the like. The current block (1435) can include a plurality of strings (e.g., strings (1430) and (1431)). In an example, the current block (1435) is divided into a plurality of continuous strings where one string is followed by a next string along a scan order. The scan order can be any suitable scan order, such as a raster scan order, a traverse scan order, or other pre-defined scan orders.

The reconstructed region (1420) can be used as a reference area to reconstruct the strings (1430) and (1431).

For each of the plurality of strings, a string offset vector (referred to as an SV) and/or a length of the string (referred to as a string length) can be signaled or inferred. The SV (e.g., a SV0) can be a displacement vector that indicates a displacement between the string (e.g., the string (1430)) to be reconstructed and a respective reference string (e.g., a reference string (1400)) that is located in the reference area (1420) already reconstructed. The reference string can be used to reconstruct the string to be reconstructed. Thus, the SV can indicate where the corresponding reference string is located in the reference area (1420). The string length can also correspond to a length of the reference string. Referring to FIG. 14, the current block (1435) is an 8×8 CB including 64 samples and is divided into two strings (e.g., the strings (1430) and (1431)) using the raster scan order. The string (1430) includes first 29 samples of the current block (1435), and the string (1431) includes remaining 35 samples of the current block (1435). The reference string (1400) used to reconstruct the string (1430) can be indicated by a corresponding string vector SV0, and a reference string (1401) used to reconstruct the string (1431) can be indicated by a corresponding string vector SV1.

In general, a string size (also referred to as a string length) can refer to a length of a string or a number of samples in a string. Referring to FIG. 14, the string (1430) includes 29 samples, and thus a string size or a string length of the string (1430) is 29. The string (1431) includes 35 samples, and thus a string size or a string length of the string (1431) is 35. A string location (or a string position) can be represented by a sample position of a sample (e.g., a first sample in a decoding order) in the string.

The above descriptions can be suitably adapted to reconstruct a current block that includes any suitable number of strings. Alternatively, in an example, when a sample in a current block does not have a matching sample in a reference area, an escape sample (or an escape pixel) is signaled, and a value of the escape sample can be coded directly without referring to a reconstructed sample in the reference area. In an example, a block includes a plurality of strings and one or more escape samples where the plurality of strings is reconstructed using the string copy mode and the one or more escape samples are coded directly and are not predicted using the string copy mode. The one or more escape samples can be located at any suitable position(s) within the block. In an example, the one or more escape samples in the block are located outside the plurality of strings.

In an example, a string in a block includes one or more escape samples that are located within the string. Thus, the one or more escape samples in the string can be coded directly and are not predicted using the string copy mode and remaining samples in the string are predicted using the string copy mode. The one or more escape samples can be located at any suitable positions within the string.

In some examples, a block (e.g., a CB) only includes one string and one or more escape samples where the string is reconstructed using the string copy mode and the one or more escape samples are coded directly and are not predicted using the string copy mode.

Figure 15:
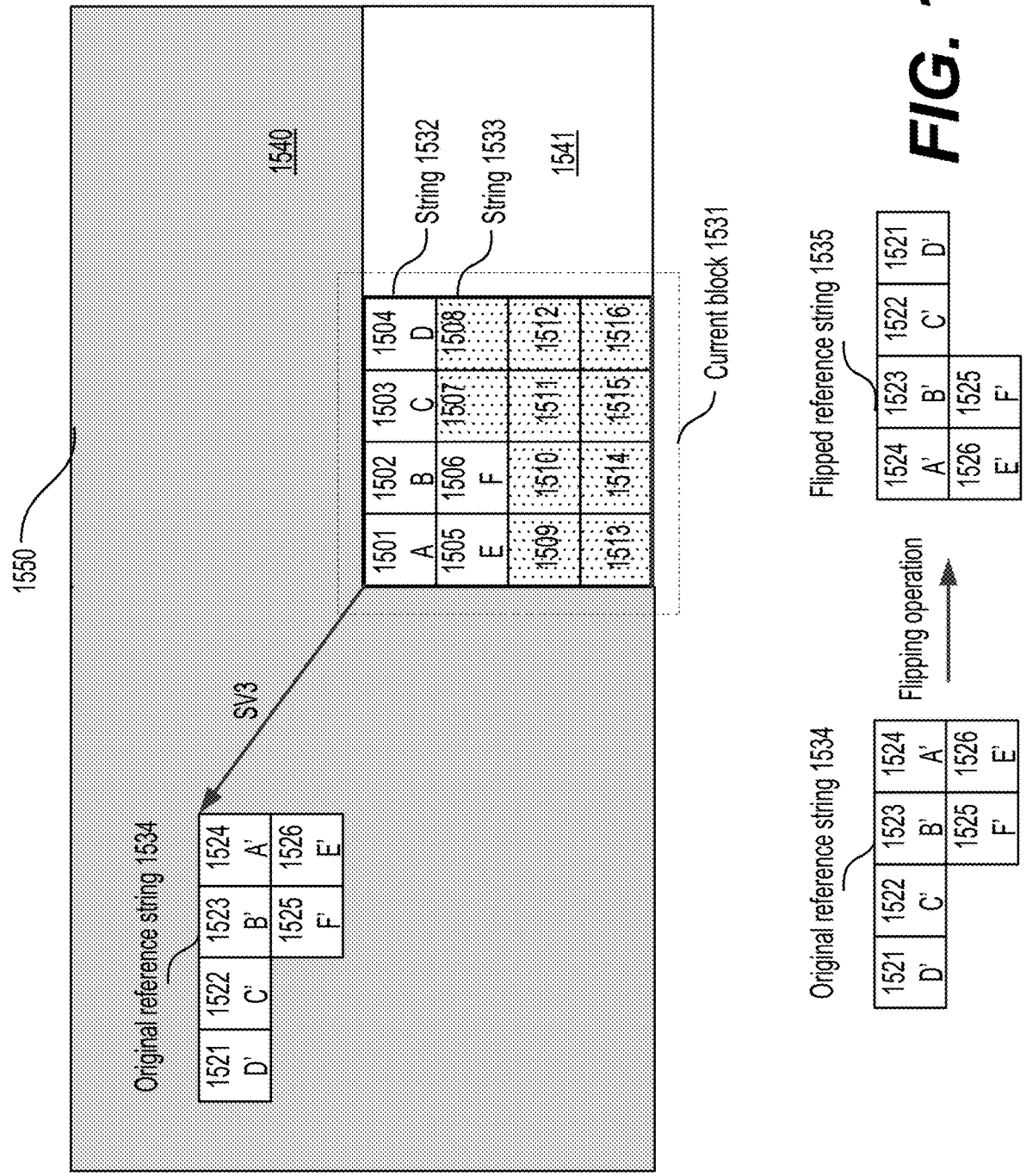
FIG. 15 shows an example of a horizontal flipping operation according to an embodiment of the disclosure.
Figure 18:
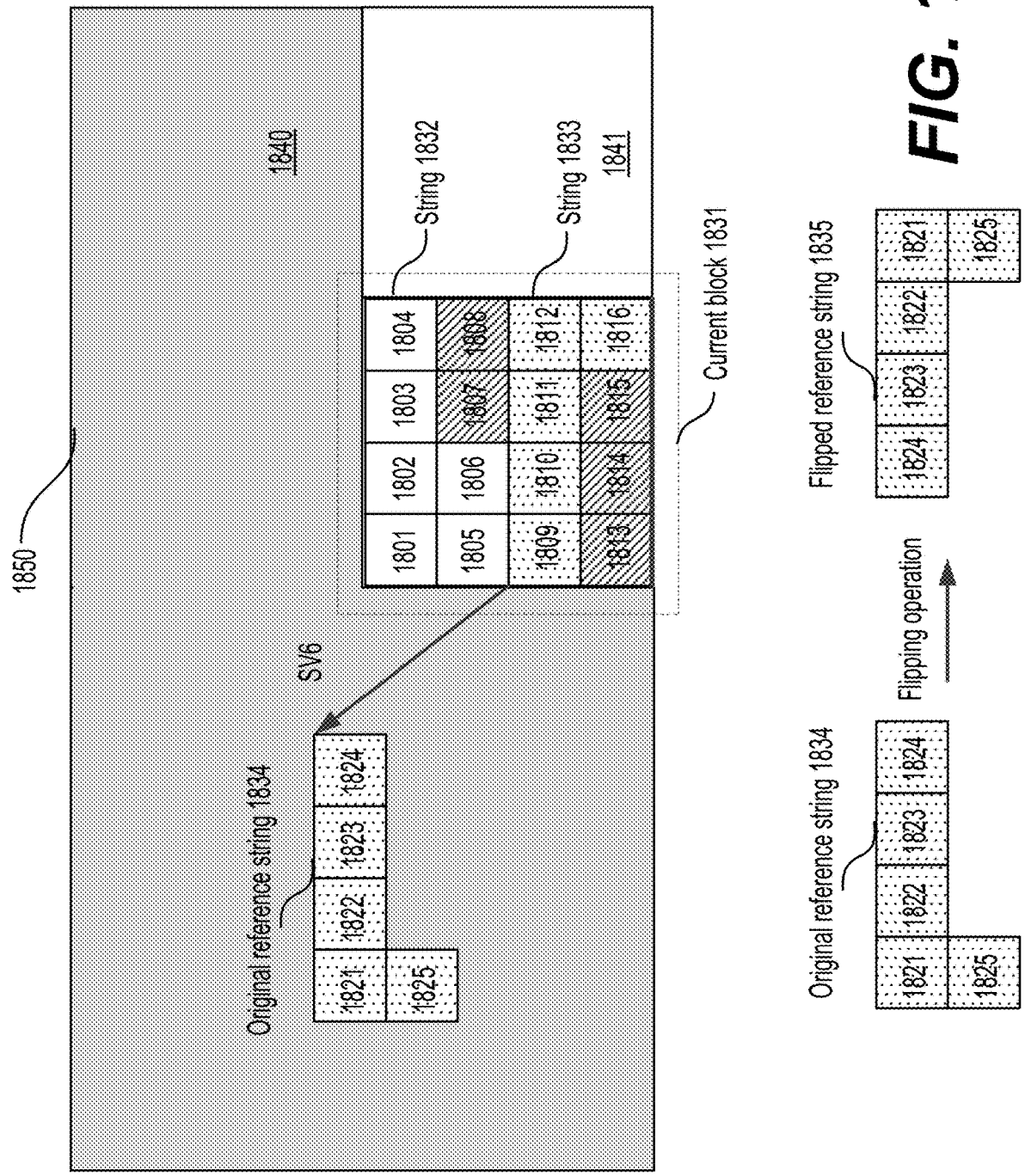
FIG. 18 shows an example of a flipping operation for a rectangular string according to an embodiment of the disclosure.

In general, a string shape (i.e., a shape of the string) can be any suitable shape, such as a non-rectangular shape (e.g., shapes of the strings (1430)-(1431) in FIG. 14, shapes of strings (1532)-(1533) in FIG. 15), a rectangular shape (e.g., a string (1833) in FIG. 18), or the like.

In some examples of the string matching (or the string copy mode), samples in a current string to be reconstructed (or predicted) and a corresponding reference string have a same order along a scan direction. For example, referring to FIG. 15, a string (1532) includes samples (1501)-(1506). Values of the samples (1501)-(1506) are represented by A, B, C, D, E, and F in a sequence. In order to apply the string copy mode to reconstruct the string (1532), a reference string in a reference area (1540) that has a pattern that is similar or identical to a pattern of A, B, C, D, E, and F arranged in the string (1532) is to be identified.

In some examples, the reference string having the pattern that is similar or identical to the pattern of A, B, C, D, E, and F arranged in the string (1532) does not exist in the reference area (1540). For example, the reference string having the same order along the scan direction may not exist. However, another reference string having a different pattern or a different order along the scan direction can be identified where the pattern or the order for the current string can be obtained from the other reference string by performing one or more flipping operations on the other reference string.

Referring to FIG. 15, a reference string (1534) having samples (1521)-(1526) can be identified in the reference area (1540). The samples (1521)-(1526) have values D', C', B', A', F', and E', respectively. In an example, a difference between the values A and A' is less than a threshold, a difference between the values B and B' is less than the threshold, a difference between the values C and C' is less than the threshold, a difference between the values D and D' is less than the threshold, a difference between the values E and E' is less than the threshold, and a difference between the values F and F' is less than the threshold. Allowing a more flexible prediction pattern or order (e.g., D', C', B', A', F', and E' along the scan direction of the reference string) in the string matching (or the string copy mode) can improve efficiency. The flexible prediction pattern or order can include a pattern or order that is flipped from a pattern or order of the string (1532).

According to aspects of the disclosure, coded information for a current block in a current picture can be decoded from a coded video bitstream. The coded information can indicate the string copy mode for the current block that includes a current string.

Whether a flipping operation is performed to predict the current string can be determined. The flipping operation can include flipping an original reference string in the current picture to generate a flipped reference string. Based on the flipping operation being determined as used to predict the current string, the original reference string in the current picture can be determined based on a SV of the current string. The flipped reference string can be generated by flipping the original reference string, and the current string can be reconstructed based on the flipped reference string.

Methods for applying the string matching mode (or the string copy mode) with the flipping operation on the current string in the current block to be reconstructed or predicted are disclosed in the disclosure. According to aspects of the disclosure, the flipped reference string can be used to perform a string matching prediction. The original reference string can undergo a flipping operation before being used as a predictor to predict the current string to be predicted in the string copy mode. The flipping operation can be performed on the original reference string to generate the flipped reference string, and subsequently the flipped reference string can be used as the predictor to predict the current string in the string copy mode.

Figure 16:
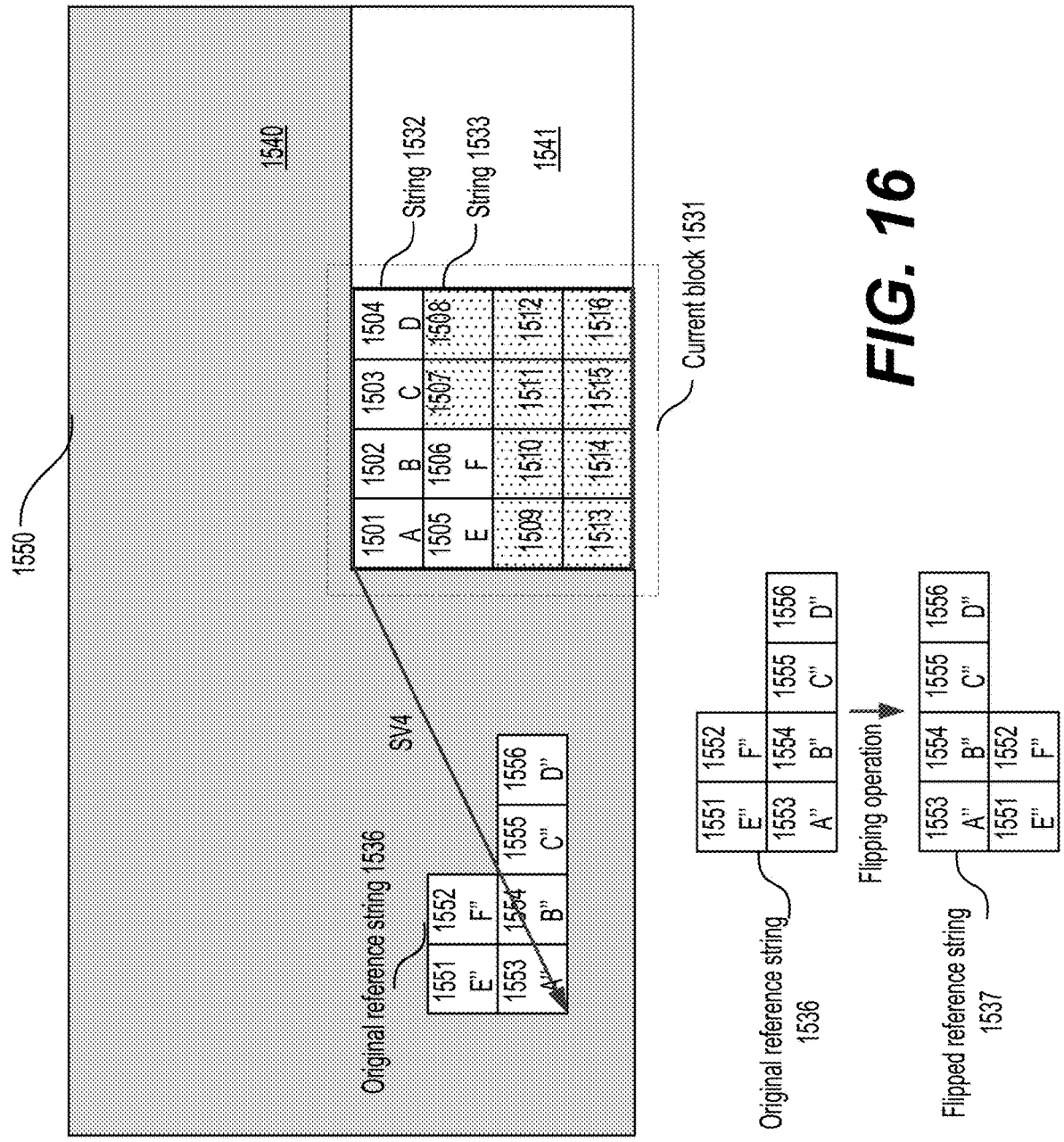
FIG. 16 shows an example of a vertical flipping according to an embodiment of the disclosure.

The flipping operation can refer to a flipping operation associated with a single flipping direction, such as a horizontal flipping operation as shown in FIG. 15 where a flipping direction is a horizontal flipping direction, a vertical flipping operation as shown in FIG. 16 where a flipping direction is a vertical flipping direction, or the like. In some examples, such as in the vertical flipping operation or the horizontal flipping operation, the flipped reference string is a mirror copy of the original reference string.

Figure 17:
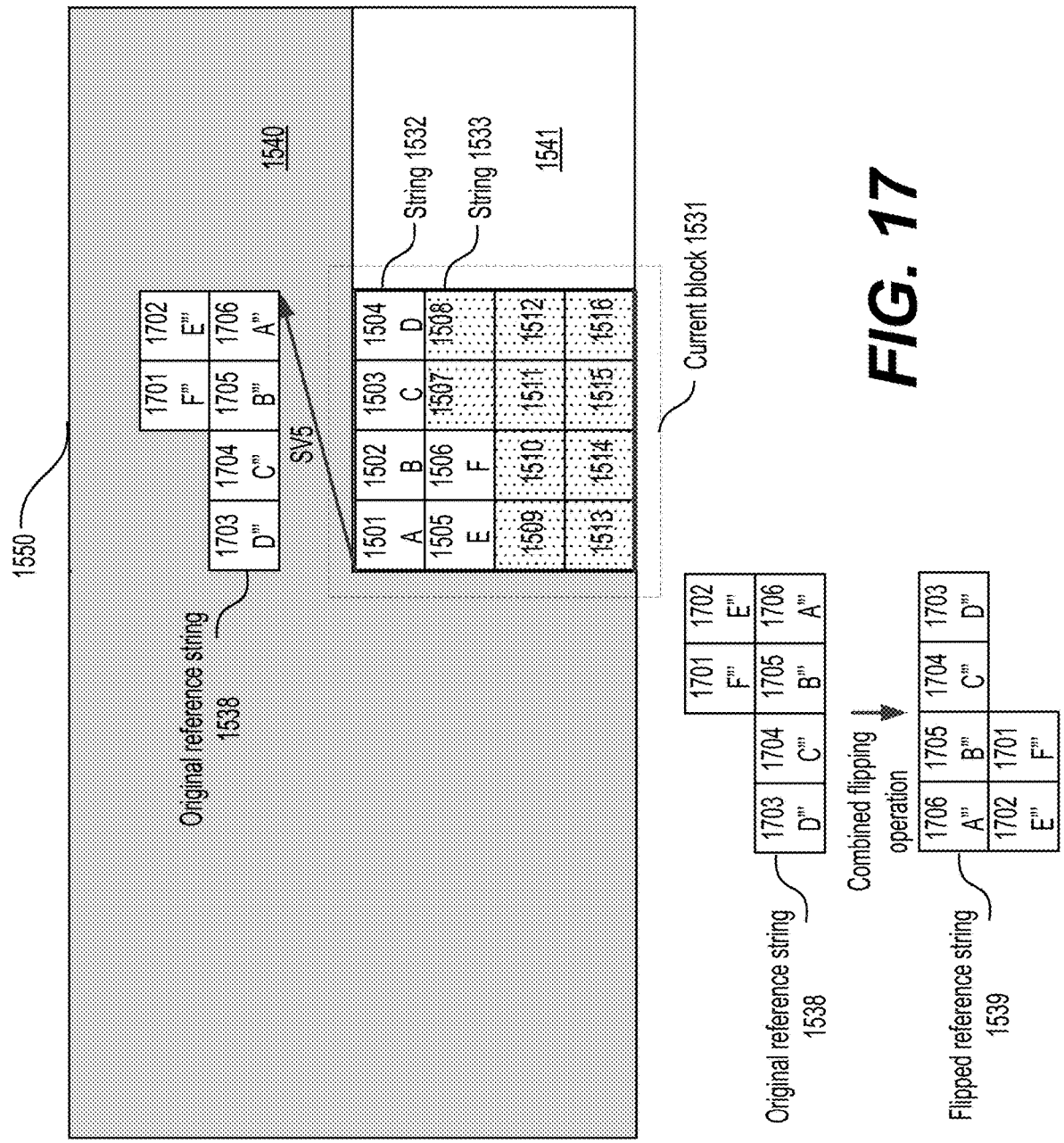
FIG. 17 shows an example of a combined flipping operation according to an embodiment of the disclosure.

The flipping operation can refer to a combined flipping operation that is associated with multiple flipping directions, such as the horizontal flipping direction and the vertical flipping direction. In an example, the combined flipping operation includes a combination of multiple flipping operations, such as the vertical flipping operation and the horizontal flipping operation as shown in FIG. 17. The combination of multiple flipping operations can be performed in various orders. In an example, the combined flipping operation is performed in a single step.

In some embodiments, the flipping operation can be performed according to other predetermined conversion patterns and/or for a portion of the original reference string.

For example, the flipping operation can be performed on a subset of the rows or columns of the original reference string.

As described above, the flipping operation can be of any suitable type (also referred to as a flipping type), such as the vertical flipping operation, the horizontal flipping operation, the combined flipping operation, or the like. When more than one flipping type is available for the current string to be predicted, a syntax element or an index can be assigned, for example, for the current string to indicate the flipping type used for the current string. The syntax element or the index indicating the flipping type can be referred to as a flipping type index. The flipping type index can be signaled at any suitable syntax level, for example, at a block-level for a string in the block. In an example, the flipping type index indicates a flipping direction and is referred to as a flipping direction index. The flipping type index can be signaled for the current string in the current block that is to be predicted. In an example, when only one flipping type is available for the current string to be predicted, the flipping type index is not signaled. The flipping type index and/or the flipping type can be inferred to be the flipping type that is available.

In an example, the flipping types available for the current string include two flipping operations, such as the vertical flipping operation and the horizontal flipping operation. Thus, the flipping type index can have one bit. For example, the flipping type index is a flag having one bit.

In an example, the flipping types available for the current string include more than two flipping operations, such as the vertical flipping operation, the horizontal flipping operation, and the combined flipping operation. Thus, the flipping type index can have multiple bits (e.g., two bits). In an example, the same flipping type index can be used to indicate the flipping types. Different values of the flipping type index can indicate different flipping types, such as the horizontal flipping operation, the vertical flipping operation, and the combined flipping operation.

Variable length coding can be used to indicate the flipping type. For example, a first value (e.g., "0") indicates the horizontal flipping operation, a second value (e.g., "01") indicates the vertical flipping operation, and a third value (e.g., "10") indicates the combined flipping operation where a number of bits used in the first value, the second value, and the third value can be different. The various operations can be associated with different values in other embodiments.

In an embodiment, different flags can be provided for a plurality of flipping operations. For example, whether to perform each of the horizontal flipping operation and the vertical flipping operation can be indicated separately using two different flags (e.g., two bits). For example, a first flag (e.g., a first bit) indicates whether the horizontal flipping operation is performed and a second flag (e.g., a second bit) indicates whether the vertical flipping operation is performed. In an example, a value "1" for the first flag and the second flag indicate performing the horizontal and vertical flipping operation, respectively, and a value "0" for the first flag and the second flag indicate not performing the horizontal and vertical flipping operation, respectively. Accordingly, values "00", "01", "10", and "11" for the first and second flags indicate (i) no flipping operation, (ii) the vertical flipping operation, (iii), the horizontal flipping operation, and (iv) the combined flipping operation, respectively, for the current string. The flags can be signaled at any suitable syntax level, for example, at a block-level for a string in the block.

As described above, when both flags (e.g., the first bit and the second bit) indicate that the horizontal flipping operation is performed and the vertical flipping operation is performed, the combined flipping operation is performed.

The above description can be suitably adapted if the first flag (e.g., the first bit) indicates whether the vertical flipping operation is performed and the second flag (e.g., the second bit) indicates whether the horizontal flipping operation is performed.

In an embodiment, different flipping type indices can be used to indicate the different flipping types, such as the horizontal flipping operation, the vertical flipping operation, and the combined flipping operation. In an example, a first index, for example, having one bit, is used to indicate whether the flipping operation is the vertical flipping operation or the horizontal flipping operation, and a second index, for example, having one bit, is used to indicate whether the flipping operation is the combined flipping operation. The different flipping type indices can be signaled at any suitable syntax level, for example, at a block-level for strings in the block. In According to aspects of the disclosure, the flipping operation can be one of (i) the vertical flipping operation, (ii) the horizontal flipping operation, and (iii) the combined flipping operation. Based on the flipping operation being the vertical flipping operation, the flipped reference string can be generated by vertically flipping the original reference string. Based on the flipping operation being the horizontal flipping operation, the flipped reference string can be generated by horizontally flipping the original reference string. Based on the flipping operation being the combined flipping operation, the flipped reference string can be generated by vertically and horizontally flipping the original reference string. For example, each of the flipping operations can correspond to a different type of flipping operation.

In an embodiment, the coded information includes a string-level flag for the current string signaled after a string length of the current string. The string-level flag can indicate whether the flipping operation is performed to predict the current string.

According to aspects of the disclosure, a horizontally flipped (or mirrored) reference string can be used to perform a string matching prediction in the string copy mode. An original reference string can undergo a horizontal flipping operation before being used as a predictor to predict the current string in the string copy mode.

FIG. 15 shows an example of the horizontal flipping operation according to an embodiment of the disclosure. A current picture (1550) includes the reconstructed region (a gray area) (also referred to as the reference area) (1540) that is already reconstructed and a region (1541) that is under reconstruction. A current block (1531) in the region (1541) is under reconstruction. The current block (1531) can be a CB, a CU, a PB, a PU, or the like. The current block (1531) includes a plurality of strings (e.g., the string (1532) and a string (1533)). The reconstructed region (1540) can be used as the reference area to reconstruct the strings (1532) and (1533).

To reconstruct a current string (e.g., the string (1532)), the reference string (1534) (also referred to as an original reference string) that is within the reference area (1540) is determined based on a SV (e.g., a SV3). The SV (e.g., the SV3) can be a displacement vector that indicates a displacement between the current string (e.g., the string (1532)) and the corresponding reference string (1534) that is located in the reference area (1540). A flipping operation (e.g., a horizontal flipping operation) is performed on the original reference string (1534) to generate a flipped reference string (also referred to a horizontally flipped reference string)

(1535). Subsequently, the flipped reference string (1535) can be used as a predictor to predict the current string (1532) in the string copy mode.

In general, the SV (e.g., the SV3) for the current string to be predicted (e.g., the string (1532)) can be the displacement vector between the current string (e.g., the string (1532)) and the original reference string (e.g., the string (1534)). The SV can point to any suitable location, such as a pre-defined location that is known to both an encoder and a decoder, of the original reference string from a pre-defined location in the current string. In an embodiment, the SV can point from a sample location of a sample (e.g., a first sample or a starting sample to be reconstructed in a scanning order) in the current string to a sample location of a corresponding sample in the original reference string used to predict the sample in the current string. Referring to FIG. 15, the current string is the string (1532), a sample in the string (1532) is the sample (1501) having the value A. The original reference string is the string (1534), and a corresponding sample in the original reference string (1534) used to predict the sample (1501) is the sample (1524) having the value A'. The SV3 points to the sample location of the sample (1524) of the original reference string (1534) from the sample location of the sample (1501) in the string (1532).

In an embodiment, the flipping operation is the horizontal flipping operation, the SV can point from a left-most sample in a top-most row of the current string to be predicted to a right-most sample in a top-most row of the original reference string. Referring to FIG. 15, the SV3 points from the sample (1501) that is a left-most sample in a top-most row of the string (1532) to the sample (1524) that is a right-most sample of a top-most row of the original reference string (1534). In an example show in FIG. 15, due to the flipping operation, the sample (1524) is used to predict the sample (1501).

In general, the flipping operation refers to an operation applied to the original reference string to generate the flipped reference string, and an inverse flipping operation refers to an operation applied to the current string to be predicted to determine the original reference string. The original reference string can be determined by applying the inverse flipping operation to the current string. A shape of the original reference string can be determined by applying the inverse flipping operation to a shape of the current string.

Referring to FIG. 15, the original reference string (1534) can be determined as follows. A sample at a pre-defined location (e.g., the right-most sample of the top-most row) in the original reference string can be determined based on the SV and a sample at a pre-defined location (e.g., the left-most sample in the top-most row) in the current string. For example, as the SV3 points from the sample (1501) that is the left-most sample in the top-most row of the string (1532) to the sample (1524) that is the right-most sample of the top-most row of the original reference string (1534), the sample (1524) that is the right-most sample of the top-most row of the original reference string (1534) is determined based on the SV3 and the sample (1501) of the string (1532). Subsequently, the original reference string (1534) (or the shape of original reference string (1534)) is determined by flipping the current string (1532) (or the shape of the string (1532)).

The flipped reference string (1535) is generated by applying the horizontal flipping operation to the original reference string (1534). The current string (1532) can be predicted using the flipped reference string (1535). The flipped reference string (1535) can have a same shape (or pattern) as that of the string (1532). The original reference string (1534) and the string (1532) are mirror copies of each other.

Benefits of using the flipping operation (e.g., the horizontal flipping operation) in the string copy mode are described below. In the example shown in FIG. 15, the string (1532) includes the samples (1501)-(1506) having the corresponding values of A to F, respectively. The values of A to F in the string (1532) are arranged in a first pattern including the values A to D from left to right in a first row (the top-most row) and the values E to F from left to right in a second row. The first pattern is associated with the string (1532). In an example, no similar or identical pattern to the first pattern can be identified in the reference area (1540), and thus the string copy mode may not be applied to predict the string (1532) or the string copy mode may not be applied to predict the string (1532) efficiently (e.g., a difference between a reference string and the string (1532) is relatively large).

On the other hand, the original reference string (1534) includes samples (1521)-(1526) having corresponding values of D', C', B', A', F', and E', respectively where the values A to F are similar or identical to the values A' to F', respectively. In an embodiment, a difference between one of the values A to F and a corresponding one of the values A' to F' used to predict the one of the values A to F is less than the threshold. For example, a difference between the values A and A' is less than the threshold. The values of A' to F' in the original reference string (1534) are arranged in a second pattern including the values D', C', B', and A' from left to right in a first row and the values F' and E' from left to right in a second row. The second pattern is associated with the original reference string (1534).

The first pattern and the second pattern are different. For example, the sample (1524) used to predict the sample (1501) is the right-most sample in the string (1534) while the sample (1501) is the left-most sample in the string (1532). However, the second pattern in the reference area (1540) is similar or identical to a flipped copy (e.g., a mirror copy) of the first pattern. Thus, the original reference string (1534) can be flipped to generate the flipped reference string (1535) associated with a third pattern that is similar or identical to the first pattern. The third pattern includes the values A', B', C', and D' from left to right in a first row and the values E' and F' from left to right in a second row in the flipped reference string (1535). The second pattern and the third pattern are flipped copies of each other.

Thus, in addition to using a pattern similar or identical to a pattern (e.g., the first pattern) of the current string to predict the current string in the string copy mode, a pattern (e.g., the second pattern) that is similar or identical to a flipped copy of the pattern (e.g., the first pattern) of the current string (e.g., the string (1532)) can be used in the string copy mode to predict the current string, enabling a more flexible and efficient string copy mode.

In some examples, a current string to be predicted only includes one column. Thus, a horizontally flipped reference string generated by the horizontal flipping operation on an original reference string having one column is identical to the original reference string. Therefore, the horizontal flipping operation does not change the original reference string. In some examples, the horizontal flipping operation is prohibited or disabled if the current string includes only one column. A string including only one column can occur in a vertical scan order. In an example, a string including only one column only occurs in the vertical scan order.

According to aspects of the disclosure, a vertically flipped (or mirrored) reference string can be used to perform a string matching prediction in the string copy mode. An original reference string can undergo a vertical flipping operation before being used as a predictor to predict the current string in the string copy mode.

FIG. 16 shows an example of the vertical flipping according to an embodiment of the disclosure. The current picture (1550) includes the reconstructed region (1540) and the region (1541) that is under reconstruction. The current block (1531) is under reconstruction. The current block (1531) includes the plurality of strings (e.g., the strings (1532) and (1533)). The reconstructed region (1540) can be used as the reference area to reconstruct the strings (1532) and (1533).

To reconstruct the current string (e.g., the string (1532)), a reference string (1536) (also referred to as an original reference string) that is within the reconstructed region (1540) is determined based on a SV (e.g., a SV4). The SV4 can be a displacement vector that indicates a displacement between the current string (e.g., the string (1532)) and the corresponding reference string (1536) that is located in the reference area (1540). A flipping operation (e.g., a vertical flipping operation) is performed on the original reference string (1536) to generate a flipped reference string (also referred to a vertically flipped reference string) (1537). Subsequently, the flipped reference string (1537) can be used as a predictor to predict the current string (1532) in the string copy mode.

In general, the SV can point to any suitable location of the original reference string from a pre-defined location in the current string to be predicted. Referring to FIG. 16, the current string is the string (1532). The original reference string is the string (1536). A corresponding sample (1553) in the original reference string (1536) having the value A" is used to predict the sample (1501) having the value A in the string (1532). The SV4 points to a sample location of the sample (1553) of the original reference string (1536) from the sample location of the sample (1501) in the string (1532).

In an embodiment, the flipping operation is the vertical flipping operation, the SV can point from the left-most sample in the top-most row of the current string to a left-most sample in a bottom-most row of the original reference string. Referring to FIG. 16, the SV4 points from the sample (1501) that is the left-most sample in the top-most row of the string (1532) to the sample (1553) that is a left-most sample of a bottom-most row of the original reference string (1536). In an example show in FIG. 16, due to the flipping operation, the sample (1553) is used to predict the sample (1501).

Referring to FIG. 16, the original reference string (1536) can be determined as follows. As the SV4 points from the sample (1501) that is the left-most sample in the top-most row of the string (1532) to the sample (1553) that is the left-most sample of the bottom-most row of the original reference string (1536), the sample (1553) that is the left-most sample of the bottom-most row of the original reference string (1536) is determined based on the SV4 and the sample (1501) of the string (1532). Subsequently, the original reference string (1536) (or a shape of original reference string (1536)) is determined by vertically flipping the string (1532) (or the shape of the string (1532)).

The flipped reference string (1537) is generated by applying the vertical flipping operation to the original reference string (1536). The current string (1532) can be predicted using the flipped reference string (1537). The flipped reference string (1537) can have a same shape (or pattern) as that of the string (1532). The original reference string (1536) and the string (1532) are mirror copies of each other.

Benefits of using the flipping operation (e.g., the vertical flipping operation) in the string copy mode is described below. In the example shown in FIG. 16, the values A to F in the string (1532) are arranged in the first pattern as described with reference to FIG. 15. As described above, no similar or identical pattern to the first pattern can be identified in the reference area (1540), and thus the string copy mode may not be applied to predict the string (1532) or the string copy mode may not be applied to predict the string (1532) efficiently.

On the other hand, the original reference string (1536) includes samples (1551)-(1556) having corresponding values of E", F", A", B", C", and D", respectively where the values A to F are similar or identical to the values A" to F", respectively. In an embodiment, a difference between one of the values A to F and a corresponding one of the values A" to F" used to predict the one of the values A to F is less than the threshold. For example, a difference between the values A and A" is less than the threshold. The values A"-F" in the original reference string (1536) are arranged in a fourth pattern including the values E" and F" from left to right in a first row and the values A", B", C", and D" from left to right in a second row. The fourth pattern is associated with the original reference string (1536).

The first pattern and the fourth pattern are different. For example, the sample (1553) used to predict the sample (1501) is in the bottom-most row in the string (1536) while the sample (1501) is in the top-most row in the string (1532). However, the fourth pattern in the reference area (1540) is similar or identical to a flipped copy (e.g., a mirror copy) of the first pattern. Thus, the original reference string (1536) can be flipped to generate the flipped reference string (1537) associated with a fifth pattern that is similar or identical to the first pattern. The fifth pattern includes the values A", B", C", and D" from left to right in a first row and the values E" and F" from left to right in a second row in the flipped reference string (1537). The fourth pattern and the fifth pattern are flipped copies of each other.

Thus, a pattern (e.g., the fourth pattern) that is similar or identical to a flipped copy of a pattern (e.g., the first pattern) of the current string (e.g., the string (1532)) can be used in the string copy mode to predict the current string, enabling a more flexible and efficient string copy mode.

In some examples, a current string to be predicted only includes one row. Thus, a vertically flipped reference string generated by the vertical flipping operation on an original reference string having one row is identical to the original reference string. Therefore, the vertical flipping operation does not change the original reference string. In some examples, the vertical flipping operation is prohibited or disabled if the current string includes only one row. A string including only one row can occur in a horizontal scan order. In an example, a string including only one row only occurs in the horizontal scan order.

According to aspects of the disclosure, a combined flipping operation can be applied to a reference string to generate a flipped reference string where the flipped reference string is used as a predictor to perform a string matching prediction in the string copy mode. The combined flipping operation can include any suitable flipping operations performed sequentially in any suitable order. The combined flipping operation can also be performed in a single step where the reference string is mapped into the flipped reference string directly.

In an example, the combined flipping operation includes the horizontal flipping operation such as described with reference to FIG. 15 and the vertical flipping operation such as described with reference to FIG. 16. The horizontal flipping operation and the vertical flipping operation can be combined to generate the flipped reference string. The order in which the combined operations are performed can vary depending on the embodiment.

FIG. 17 shows an example of the combined flipping operation according to embodiments of the disclosure. The current picture (1550) includes the reconstructed region (1540) and the region (1541) that is under reconstruction. The current block (1531) in the region (1541) is under reconstruction. The current block (1531) includes the plurality of strings (e.g., the strings (1532) and (1533)). The reconstructed region (1540) can be used as the reference area to reconstruct the strings (1532) and (1533).

To reconstruct the current string (e.g., the string (1532)), a reference string (1538) (also referred to as an original reference string) that is within the reconstructed region (1540) is determined based on a SV (e.g., a SV5). The SV5 can be a displacement vector that indicates a displacement between the current string (e.g., the string (1532)) and the corresponding reference string (1538) that is located in the reference area (1540). The combined flipping operation is performed on the original reference string (1538) to generate a flipped reference string (1539). Subsequently, the flipped reference string (1539) can be used as a predictor to predict the current string (1532) in the string copy mode.

As described above, the combined flipping operation can be performed on the original reference string (e.g., the reference string (1538)) to generate the flipped reference string (e.g., the flipped reference string (1539)) according to any suitable method and/or order. The combined flipping operation can be performed on the original reference string (e.g., the reference string (1538)) to generate the flipped reference string (e.g., the flipped reference string (1539)) using one or more steps.

In an embodiment, the combined flipping operation can be performed in two steps. In an example, the original reference string (1538) is vertically flipped to generate a first intermediate string, and subsequently the first intermediate string is horizontally flipped to generate the flipped reference string (1539). In an example, the original reference string (1538) is horizontally flipped to generate a second intermediate string, and subsequently the second intermediate string is vertically flipped to generate the flipped reference string (1539).

In an embodiment, the combined flipping operation can be performed in a single step. For example, the original reference string (1538) is directly flipped to generate the flipped reference string (1539).

In general, the SV can point to any suitable location of the original reference string from a pre-defined location in the current string to be predicted. Referring to FIG. 17, the current string is the string (1532). The original reference string is the string (1538). A corresponding sample (1706) in the original reference string (1538) having the value A' is used to predict the sample (1501) having the value A in the string (1532). The SV5 points to the sample location of the sample (1706) of the original reference string (1538) from the sample location of the sample (1501) in the string (1532).

In an embodiment, the flipping operation is the combined flipping operation including both the horizontal flipping operation and the vertical flipping operation, the SV can point from the left-most sample in the top-most row of the current string to a right-most sample in a bottom-most row of the original reference string. Referring to FIG. 17, the SV5 points from the sample (1501) that is the left-most sample in the top-most row of the string (1532) to the sample (1706) that is a right-most sample of a bottom-most row of the original reference string (1538). In an example show in FIG. 17, due to the combined flipping operation, the sample (1706) is used to predict the sample (1501).

Referring to FIG. 17, the original reference string (1538) can be determined as follows. As the SV5 points from the sample (1501) that is the left-most sample in the top-most row of the string (1532) to the sample (1706) that is the right-most sample of the bottom-most row of the original reference string (1538), the sample (1706) that is the right-most sample of the bottom-most row of the original reference string (1538) is determined based on the SV5 and the sample (1501) of the string (1532). Subsequently, the original reference string (1538) (or a shape of original reference string (1538)) is determined by the inverse flipping operation of the combined flipping operation, such as vertically and horizontally flipping the string (1532) (or the shape of the string (1532)).

Benefits of using the combined flipping operation in the string copy mode is described below. In the example shown in FIG. 17, the values A to F in the string (1532) are arranged in the first pattern as described with reference to FIG. 15. As described above, no similar or identical pattern to the first pattern can be identified in the reference area (1540), and thus the string copy mode may not be applied to predict the string (1532) or the string copy mode may not be applied to predict the string (1532) efficiently.

On the other hand, the original reference string (1538) includes samples (1701)-(1706) having corresponding values of F''', E''', D''', C''', B''', and A''' respectively where the values A to F are similar or identical to the values A''' to F''', respectively. In an embodiment, a difference between one of the values A to F and a corresponding one of the values A''' to F''' used to predict the one of the values A to F is less than the threshold. For example, a difference between the values A and A''' is less than the threshold. The values A'''-F''' in the original reference string (1538) are arranged in a sixth pattern including the values F''' and E''' from left to right in a first row and the values D'' C''', B''', and A' from left to right in a second row. The sixth pattern is associated with the original reference string (1538).

The first pattern and the sixth pattern are different. For example, the sample (1706) used to predict the sample (1501) is the right-most sample in the bottom-most row in the string (1538) while the sample (1501) is the left-most sample in the top-most row in the string (1532). However, the sixth pattern in the reference area (1540) is similar or identical to a copy of the first pattern that is flipped in both the horizontal direction and the vertical direction. Thus, the original reference string (1538) can be flipped to generate the flipped reference string (1539) associated with a seventh pattern that is similar or identical to the first pattern. The seventh pattern includes the values A''', B''', C''', and D''' from left to right in a first row and the values E''' and F''' from left to right in a second row in the flipped reference string (1539). The sixth pattern is a flipped copy of the seventh pattern that is flipped in both the horizontal direction and the vertical direction.

Thus, a pattern (e.g., the sixth pattern) that is similar or identical to a flipped copy of a pattern (e.g., the first pattern) of a current string (e.g., the string (1532)) can be used in the string copy mode to predict the current string, enabling a more flexible and efficient string copy mode.

In some examples, a current string to be predicted only includes one line (e.g., one row or one column) of samples. Thus, only one of the vertical flipping operation and the horizontal flipping operation can change the original reference string that corresponds to the current string. In some examples, the combined flipping operation is prohibited or disabled if the current string includes only one line (e.g., one row or one column).

In an example, the current string only includes one row, and the combined flipping operation is prohibited for the current string. The horizontal flipping operation can be allowed for the current string. In addition, the vertical flipping operation is prohibited for the current string.

In an example, the current string only includes one column, and the combined flipping operation is prohibited for the current string. The vertical flipping operation can be allowed for the current string. In addition, the horizontal flipping operation is prohibited for the current string.

According to aspects of the disclosure, a syntax element or an index, such as a flipping type index can be assigned to indicate the combined flipping operation. In an example, the same flipping type index can be used to indicate the flipping type. Different values of the flipping type index can indicate different flipping types, such as the horizontal flipping operation, the vertical flipping operation, and the combined flipping operation.

Variable length coding can be used to indicate the flipping type. For example, a first value (e.g., "0") indicates the horizontal flipping operation, a second value (e.g., "01") indicates the vertical flipping operation, and a third value (e.g., "10") indicates the combined flipping operation where a number of bits used in the first value, the second value, and the third value can be different.

In an embodiment, whether to perform each of the horizontal flipping operation and the vertical flipping operation can be indicated separately using different bits. For example, one bit (e.g., a first bit) indicates whether the horizontal flipping operation is performed and another bit (e.g., a second bit) indicates whether the vertical flipping operation is performed. When both bits (e.g., the first bit and the second bit) indicate that the horizontal flipping operation is performed and the vertical flipping operation is performed, the combined flipping operation is performed.

In an embodiment, different flipping type indices can be used to indicate the different flipping types, such as the horizontal flipping operation, the vertical flipping operation, and the combined flipping operation. In an example, a first index is used to indicate whether the flipping operation is the vertical flipping operation or the horizontal flipping operation, and a second index is used to indicate whether the flipping operation is the combined flipping operation.

According to aspects of the disclosure, one or more methods can be used to indicate (e.g., signal) the flipping operation in the string copy mode for a current block to be predicted and/or a current string to be predicted where the current string is in the current block. The one or more methods can be used separately or combined whenever applicable. The one or more methods can indicate (e.g., signal) whether the flipping operation is used for the current block and/or the current string. The one or more methods can indicate (e.g., signal) the flipping type used for the current string in the string copy mode.

In an embodiment, the entire current block (e.g., the entire CB) can use flipped reference string(s) in the string copy mode. For example, the current block (e.g., the block (1531)) includes at least one string (e.g., the strings (1532)-(1533)). Each of the at least one string is to be predicted using a corresponding flipped reference string. For example, the string (1532) is to be predicted using the flipped reference string (1535). The string (1533) is to be predicted using another flipped reference string, similar to that described with reference to FIGS. 15-17.

A block-level flag for the current block can be used to indicate whether at least one flipped reference string (e.g., two different flipped reference strings) is used for predicting the at least one string (e.g., the strings (1532)-(1533)) in the current block using the string copy mode. In some examples, the block-level flag for the current block is used to indicate that the at least one flipped reference string is used for predicting the at least one string (e.g., the strings (1532)-(1533)) in the current block (e.g., the block (1531)) using the string copy mode.

In an example, the block-level flag for the current block indicates whether each of the at least one string in the current block is predicted using the respective flipped reference string. For example, the block-level flag for the current block indicates that each of the at least one string in the current block is predicted using the respective flipped reference string.

According to aspects of the disclosure, the current string is one of at least one string included in the current block. The coded information can include the block-level flag for the current block. The block-level flag can indicate that at least one flipping operation is performed on the at least one string to predict the current block. The block-level flag can indicate that a flipping operation is performed on each of the at least one string to predict the current block. Accordingly, the at least one flipping operation can be determined as used to predict the current block based on the block-level flag indicating that a flipping operation is performed on each of the at least one string to predict the current block where the at least one flipping operation includes the flipping operation performed on the original reference string.

According to aspects of the disclosure, the current string is one of a plurality of strings included in the current block. The coded information can include the block-level flag for the current block. A first value of the block-level flag can indicate that each of the plurality of strings is to be predicted using a respective flipping operation, a second value of the block-level flag can indicate that no flipping operation is to be performed on the plurality of strings. In an example, the block-level flag has the first value, and thus each of the plurality of strings is to be predicted using the respective flipping operation. Accordingly, the flipping operation is determined as performed to predict the current string based on the block-level flag having the first value.

According to aspects of the disclosure, the current string is one of at least one string included in the current block. A number of the at least one string in the current block is larger than a first threshold (also referred to as a number threshold), and thus at least one flipping operation for the at least one string can be determined as prohibited for the current block based on the number of the at least one string in the current block being larger than the first threshold. The at least one flipping operation includes the flipping operation performed on the original reference string, and the flipping operation is determined as prohibited. In an example, the at least one string corresponds to the plurality of strings, and the current string is the one of the plurality of strings included in the current block. The flipping operation can be determined as prohibited for the current string based on the number of the plurality of strings in the current block being larger than the first threshold.

A flag (e.g., the block-level flag) used to indicate the flipping operation for the current block can be signaled after signaling string length(s) of respective string(s) in the current block. In some embodiments, use of the flipping operation can depend on a number of strings in the current block. For example, when a number of the at least one string (e.g., a plurality of strings) in the current block is larger than the first threshold (e.g., the number threshold), the flipping operation for the current block can be prohibited. In an example, the flag (e.g., the block-level flag) is not signaled. The flag (e.g., the block-level flag) can be inferred to indicate that no flipping operation is to be performed for the current block. The first threshold can be any suitable threshold and can be obtained using any suitable method. In an example, the first threshold is a pre-defined number threshold known by an encoder and/or a decoder. In an example, the first threshold is calculated, for example, by the encoder and/or the decoder, based on a block size (e.g., a block width, a block height, a block area) of the current block. The first threshold may be signaled to the decoder.

In some examples, the current block includes the plurality of strings and a flag for the current block can indicate whether flipping operation(s) are allowed for one or more strings in the plurality of strings. A first value of the flag can indicate that the flipping operation(s) are allowed for the one or more strings in the plurality of strings. A second value of the flag can indicate that no flipping operation is allowed for the plurality of strings.

As described above, when more than one flipping type (e.g., more than one flipping direction or more than one flipping operation) is available for the current string to be predicted, a flipping type index can be used for the current string in the current block. The flipping type index can be signaled. In an example, strings in the current block can have different flipping types, a respective flipping type index is signaled for each of the strings in the current block.

Referring to FIG. 17, the current block (1531) includes the strings (1532)-(1533). A block-level flag is used to indicate whether flipping operations are used for the current block (1531). In an example, the block-level flag indicates that the flipping operations are used for the current block, and thus the strings (1532)-(1533) are to be predicted using the flipping operations. Two flipping types are available for the strings (1532)-(1533), respectively. A first flipping type index for the string (1532) is used to indicate the flipping type for the string (1532). A second flipping type index for the string (1533) is used to indicate the flipping type for the string (1533).

Whether a flipped reference string is used for a current string in the current block predicted using the string copy mode can be indicated by a string-level flag (or a string-level indication flag) for the current string in the current block. A respective string-level flag for each string in the current block can be used to indicate whether a flipping operation is used for the string.

According to aspects of the disclosure, the coded information can include the string-level flag of the current string where the string-level flag can indicate that the flipping operation is used to predict the current string. Accordingly, the flipping operation can be determined as used to predict the current string based on the string-level flag indicating that the flipping operation is performed to predict the current string.

In an embodiment, use of the flipping operation can depend on a string length of the current string, such as when a number of samples in the current string is less than a second threshold (also referred to as a length threshold). The flipping operation can be determined as prohibited for the current string based on the string length of the current string being less than the second threshold.

The flipping operation for the current string to be predicted can be prohibited when the string length of the current string is less than the length threshold (e.g., a pre-defined length threshold), and related flag(s) (e.g., the string-level flag, a flipping type index, and/or the like), if any, to indicate the flipping operation for the current string need not be signaled.

As described above, when more than one flipping type (e.g., more than one flipping direction or more than one flipping operation) is available (or can be used) for one of the strings in the current block that uses a flipping operation, a flipping type index can be used for the one of the strings in the current block. The flipping type index can be signaled. In an example, strings in the current block can have different flipping types, a respective flipping type index is used (e.g., signaled) for each of the strings in the current block.

Referring to FIG. 17, the current block (1531) includes the strings (1532)-(1533). Two string-level flags are used to indicate whether flipping operations are used for the strings (1532)-(1533), respectively. In an example, a first string-level flag for the string (1532) indicates that the flipping operation is used for the string (1532), and a second string-level flag for the string (1533) indicates that no flipping operation is used for the string (1533). More than one flipping type is available for the string (1532), and a flipping type index for the string (1532) is used to indicate the flipping type for the string (1532).

In general, the flipping operation can be effective if the flipped reference string generated by flipping the original reference string is different from the original reference string. If the flipped reference string is identical to the original reference string, the flipping operation is not effective and may not be an option. Thus, the flipping operation is not used. Under certain conditions, the flipping operation can be inferred as not being used, and the block-level flag or the string-level flag may not need to be signaled.

The flipping operation (e.g., the horizontal flipping operation, the vertical flipping operation, or the combined flipping operation) can be effective if a starting sample (or a first sample to be scanned) and an ending sample (or a last sample to be scanned) of the current string to be predicted are in two different rows of the current block to be predicted in a horizontal scan order. The flipping operation (e.g., the horizontal flipping operation, the vertical flipping operation, or the combined flipping operation) can be effective if the starting sample (or the first sample to be scanned) and the ending sample (or the last sample to be scanned) of the current string to be predicted are in two different columns of the current block to be predicted in a vertical scan order.

In some examples, the flipping operation is effective when a string length of the current string to be predicted is longer than a length of one row (e.g., the block width) of the current block or a length of one column (e.g., a block height) of the current block.

According to aspects of the disclosure, if a certain flipping operation (e.g., the horizontal flipping operation or the vertical flipping operation) results in the flipped reference string that is identical to the original reference string, the certain flipping operation may not be an option and can be inferred as not being used. For example, the certain flipping operation is not used. In an example, the certain flipping operation is not signaled. In an example, the current string to be predicted only includes one row, and thus the original reference string also includes only one row. The vertical flipping operation is not an option and is not used as vertically flipping the original reference string results in the flipped reference string that is identical to the original reference string. In an example, the current string to be predicted only includes one column, and thus the original reference string also includes only one column. The horizontal flipping operation is not an option and is not used as horizontally flipping the original reference string results in the flipped reference string that is identical to the original reference string.

In some examples, the flipping operation is efficient, and thus is enabled. A flag (e.g., the string-level flag) for the current string to be predicted can be signaled after signaling the string length of the current string where the flag indicates whether the flipping operation is to be applied to the current string.

In an example, in the horizontal scan order, if a starting sample (or a first sample to be scanned) and an ending sample (or a last sample to be scanned) of the current string to be predicted are in a same row of the current block, then the current string only has one row of samples and the vertical flipping operation cannot be an option. The vertical flipping operation is inferred as not used. For the current string that only has one row of samples, if only the vertical flipping operation is to be considered, for example, by a decoder, the flag (e.g., the string-level flag) indicating whether the flipping operation is applied to the current string does not need to be signaled. In an example, the flag (e.g., the string-level flag) is not signaled and is inferred to be a value that indicates no flipping operation for the current string.

On the other hand, if both the vertical flipping operation and another flipping operation (e.g., the horizontal flipping operation) can be considered, for example, by the decoder, then after choosing to perform the flipping operation for the current string that only has one row of samples, only the other flipping operation (e.g., the horizontal flipping operation) is available. Thus, the flipping type (e.g., the flipping direction) does not need to be not signaled and can be inferred to be the other flipping type (e.g., the horizontal flipping operation). In an example, the flipping type index (e.g., the flipping direction index) is not signaled and is inferred to be a value indicating the other flipping type.

FIG. 18 shows an example of the flipping operation for a rectangular string according to embodiments of the disclosure. A current picture (1850) includes a reconstructed region (also referred to as a reference area) (a gray area) (1840) and a region (1841) that is under reconstruction. A current block (1831) in the region (1841) is under reconstruction. The current block (1831) can be a CB, a CU, a PB, a PU, or the like. The current block (1831) includes a plurality of strings (e.g., strings (1832) and (1833)) and escape samples (1807)-(1808). The string (1832) includes samples (1801)-(1806) and is a non-rectangular string. The string (1833) includes samples (1809)-(1816) and is a rectangular string where the shape of the string is a rectangular shape. The reconstructed region (1840) can be used as the reference area to reconstruct the strings (1832) and (1833). A current string (e.g., the string (1833)) is a rectangular string.

According to an aspect of the disclosure, the flipping operation for a rectangular string (e.g., the string (1833)) to be predicted can be prohibited. The flipping operation can be prohibited for the current string based on the current string having a rectangular shape. In an example, the rectangular string (1833) is predicted using the string copy mode without the flipping operation.

According to an aspect of the disclosure, the flipping operation can be allowed for the rectangular string to be predicted when first samples in the rectangular string are derived from flipping the corresponding original reference string and at least one sample in the rectangular string is not derived from flipping the corresponding original reference string. The at least one sample in the rectangular string that is not derived from flipping the corresponding original reference string can be referred to as the at least one non-flipped sample. For example, the at least one non-flipped sample in the rectangular string includes escape sample(s) (or escape pixel(s)) that can be predicted without using the original reference string. As described above, value(s) of the escape sample(s) can be coded directly without referring to respective reconstructed sample(s) in the reference area. The coded at least one non-flipped sample can be arranged or rearranged when performing the string copy mode with the flipping operation.

In an embodiment, the current string has a rectangular shape and includes a sample that is not predicted using the flipping operation. The flipping operation can be determined as performed to predict a plurality of samples (e.g., the first samples) in the current string that are different from the sample that is not predicted using the flipping operation. In an example, the current string is the current block.

In an example, the rectangular string (1833) is predicted using the string copy mode with the flipping operation. The rectangular string (1833) includes first samples (e.g., the samples (1809)-(1812) and (1816)) that are predicted with the flipping operation (e.g., the horizontal flipping operation) and second samples (e.g., the samples (1813)-(1815)) that are predicted without the flipping operation. More specifically, an original reference string (1834) within the reconstructed region (1840) is determined based on a SV (e.g., a SV6). The original reference string (1834) includes samples (1821)-(1825). The flipping operation (e.g., the horizontal flipping operation) is performed on the original reference string (1834) to generate a flipped reference string (1835). Subsequently, the flipped reference string (1835) can be used as a predictor to predict the first samples in the current string (1833) in the string copy mode. For examples, the samples (1824), (1823), (1822), (1821), and (1825) in the flipped reference string (1835) are used to predict the first samples (1809)-(1812) and (1816), respectively. The second samples (1813)-(1815) are not predicted using the flipping operation and can be referred to as non-flipped samples. The second samples (1813)-(1815) can be escape samples that are coded directly without using reconstructed samples in the reconstructed region (1840).

In an example, after predicting the first samples based on the flipped reference string (1835) and coding the second samples (1813)-(1815) directly, the coded second samples (1813)-(1815) are arranged with the predicted first samples to form the predicted rectangular string (1833).

In an embodiment, the current block is the current string that has a rectangular shape. The flipping operation can be determined as used for a subset of samples in the current string. At least one sample in the current string is not predicted using the flipping operation and the subset of samples is different from the at least one sample in the current string.

In an embodiment, the current block to be predicted includes only one string. In an example, the current block is the string and the string has a rectangular shape. The flipping operation can be allowed for a subset of samples in the rectangular string where the subset of samples is predicted using the string copy mode. At least one sample in the rectangular string is not predicted using the flipping operation, and is referred to as non-flipped sample(s) in the rectangular string. The at least one sample is different from the subset of samples. The non-flipped sample(s) can be arranged or rearranged when performing the string copy mode with the flipping operation. The non-flipped sample(s) can include escape sample(s) that are coded directly without referring to respective reconstructed sample(s) in the reference area.

Figure 19:
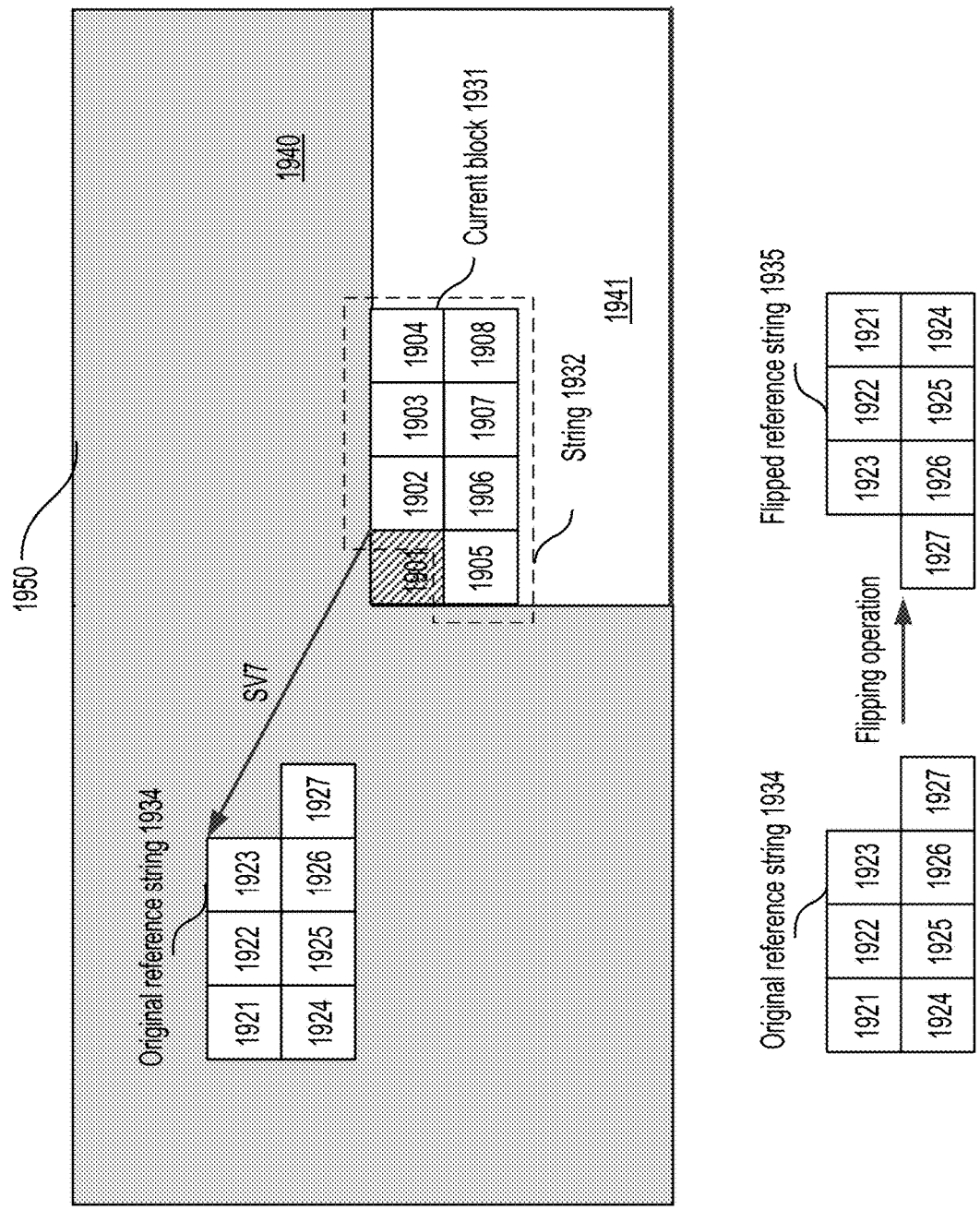
FIG. 19 shows an example of a flipping operation allowed for a current block according to an embodiment of the disclosure.

FIG. 19 shows an example of the flipping operation allowed for a current block (1931) according to embodiments of the disclosure. A current picture (1950) includes a reconstructed region (also referred to as a reference area) (a gray area) (1940) and a region (1941) that is under reconstruction. The current block (1931) in the region (1941) is under reconstruction. The current block (1931) can be a CB, a CU, a PB, a PU, or the like. The current block (1931) can include samples (1901)-(1908).

In an example, the current block (1931) is a rectangular string (1931) where the rectangular string (1931) includes the samples (1901)-(1908). The rectangular string (1931) can be reconstructed or predicted similarly as that described with reference to the string (1833) in FIG. 18. Referring to FIG. 19, the horizontal flipping operation is allowed for a subset of samples (e.g., the samples (1902)-(1908)) in the current block (or the current string) (1931) where the subset of samples is predicted using the string copy mode. The sample (1901) is not predicted using the flipping operation, and is referred to as a non-flipped sample in the current block (1931). In an example, the sample (1901) is an escape sample. An original reference string (1934) including samples (1921)-(1927) is obtained based on a SV (e.g., a SV7). A flipped reference string (1935) is generated by horizontally flipping the original reference string (1934). Subsequently, the samples (1902)-(1908) in the current string (1931) are predicted based on the flipped reference string (1935). The non-flipped sample (1901) in the current string (1931) can be directly coded and then arranged as a top-left corner of the reconstructed string (1931).

In an example, the current block includes the current string to be predicted and at least one sample outside the current string. The at least one sample outside the current string can be located at any suitable location(s) in the current block. The flipping operation can be allowed and performed for the current string, such as described with reference to the string (1532) in FIGS. 15-17. The at least one sample outside the current string is not predicted with the flipped operation. The at least one sample outside the current string can be arranged when the string copy mode is performed for the current string. In an example, the at least one sample outside the string includes escape sample(s) that are coded directly without referring to respective reconstructed sample(s) in the reference area.

In an example, referring to FIG. 19, the current block (1931) includes a current string (1932) and the sample (1901) that is outside the current string (1932). A flipping operation (e.g., the horizontal flipping operation) can be allowed for the current string (1932) that includes the samples (1902)-(1908). As described above, the sample (1901) is not predicted using the flipping operation, and is referred to as a non-flipped sample in the current block (1931). The original reference string (1934) is obtained based on the SV7. The flipped reference string (1935) is generated by horizontally flipping the original reference string (1934). Subsequently, the current string (1932) is predicted based on the flipped reference string (1935). The non-flipped sample (1901) can be directly coded and then arranged as a top-left corner of the reconstructed block (1931).

In some examples, a transform process and a quantization process are skipped. Thus, no transform and no quantization are performed on residues of the current block after the current block is predicted using the string copy mode. In some examples, a transform and a quantization are performed on the residues of the current block after the current block is predicted using the string copy mode.

In an example, the residues of the current block predicted with the flipping operation are transformed and quantized. A flag (e.g., a 1-bit flag) can be used to indicate whether the transform process is skipped. The flag can be signaled at a block-level.

In an embodiment, transform coefficients in the current block can be de-quantized. Residues of the current block can be generated by inversely transforming the transform coefficients.

Figure 20:
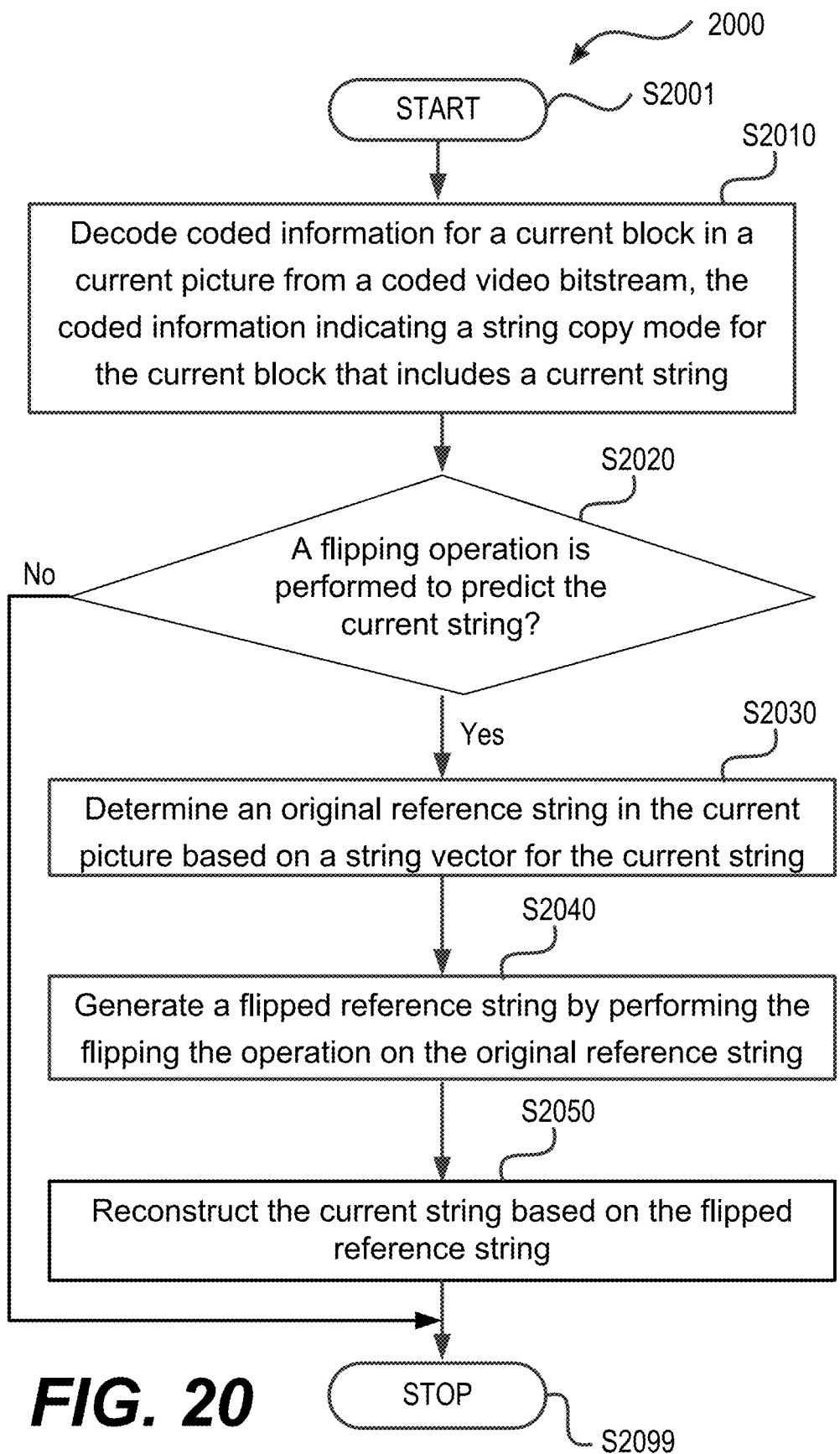
FIG. 20 shows a flow chart outlining a process (2000) according to an embodiment of the disclosure.

FIG. 20 shows a flow chart outlining a process (2000) according to an embodiment of the disclosure. The process (2000) can be used in the reconstruction of a block, such as a CB, a PB, a PU, a CU, or the like. In various embodiments, the process (2000) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (2000). The process starts at (S2001) and proceeds to (S2010).

At (S2010), coded information for a current block in a current picture can be decoded from a coded video bitstream. The coded information can indicate a string copy mode for the current block that includes a current string. The current block can include at least one string that has the current string. In an example, the at least one string includes a plurality of strings. In an example, the at least one string includes only a single string that is the current string. In an example, the current block includes escape sample(s). The escape sample(s) can be within and/or outside one or more of the at least one string. A shape of the current string can be a non-rectangular shape or a rectangular shape.

At (S2020), whether a flipping operation is performed to predict the current string can be determined. The flipping operation can include flipping an original reference string in the current picture to generate a flipped reference string.

In an embodiment, the coded information includes a block-level flag for the current block. The current string can be one of a plurality of strings included in the current block. A first value of the block-level flag can indicate that each of the plurality of strings is to be predicted using a respective flipping operation, and a second value of the block-level flag can indicate that no flipping operation is to be performed on the plurality of strings. Whether the flipping operation is performed to predict the current string can be determined based on the block-level flag. The flipping operation can be determined as performed to predict the current string based on the block-level flag having the first value.

Flipping operation can be determined as prohibited for the plurality of strings in the current block based on a number of the plurality of strings in the current block being larger than a first threshold. Accordingly, the flipping operation is determined as prohibited for the current string if the number of the plurality of strings in the current block is larger than the first threshold. In an example, when the number of the plurality of strings in the current block is larger than the first threshold, the block-level flag is not signaled and is inferred to indicate that the flipping operations are prohibited for the current block.

In an embodiment, the coded information includes a string-level flag of the current string. The string-level flag can indicate whether the flipping operation is performed to predict the current string. Whether the flipping operation is performed to predict the current string can be determined based on the string-level flag. If the string-level flag indicates that the flipping operation is performed to predict the current string, the flipping operation is determined as performed to predict the current string. The coded information can include the string-level flag for the current string signaled in the coded information after a string length of the current string.

In an example, a string length of the current string is less than a second threshold where the string length of the current string indicating a number of samples in the current string. Thus, the flipping operation is determined as prohibited for the current string. In an example, when the string length of the current string is less than the second threshold, the string-level flag is not signaled and is inferred to indicate that the flipping operation is prohibited for the current block.

In an example, the current string has a rectangular shape, and the flipping operation is determined as prohibited for the current string.

In an example, the current string has a rectangular shape and includes a sample (e.g., an escape sample) that is not predicted using the flipping operation. The flipping operation can be determined as performed to predict a plurality of samples in the current string that are different from the sample that is not predicted using the flipping operation. In an example, the current string is the current block.

In an example, the current block is the current string that has a rectangular shape. The flipping operation can be determined as used for a subset of samples in the current string. At least one sample in the current string is not predicted using the flipping operation where the subset of samples is different from the at least one sample in the current string.

In general, whether the flipping operation is used to predict the current string can be determined based on various criteria, such as one or more of the block-level flag for the current block, the string-level flag for the current string, the number of the at least one string in the current block, the string length of the current string, the shape of the current string, whether the current string includes an escape sample, and/or a number of rows and/or columns in the current string.

If the flipping operation is determined as used to predict the current string, the process (2000) proceeds to (S2030). Otherwise, if the flipping operation is determined not as used to predict the current string, the process (2000) proceeds to (S2099) and terminates.

A flipping type for the flipping operation can be any suitable type, such as (i) the vertical flipping operation, (ii) the horizontal flipping operation, or (iii) the combined flipping operation, as described above. The combined flipping operation can include the horizontal flipping and the vertical flipping of the original reference string. The combined flipping operation can be performed in a single step or multiple steps.

An index for the current string can be signaled in the coded information, for example, after signaling a string length of the current string. The index can indicate the flipping type of the flipping operation. The index can include a flipping type index (e.g., a flipping direction index), such as described with reference to FIGS. 15-19.

At (S2030), based on the flipping operation being determined as performed to predict the current string, the original reference string in the current picture can be determined based on a string vector (SV) of the current string, as described with reference to FIGS. 15-19. In an example, a sample (e.g., the sample (1524)) in the original reference string (e.g., the string (1534)) is determined based on the SV (e.g., the SV3) and a corresponding sample (e.g., the sample (1501)) in the current string (e.g., the string (1532)). Subsequently, a shape of the original reference string (including locations of remaining samples (e.g., the samples (1521)-(1523) and (1525)-(1526)) in the original reference string) can be determined by an inverse flipping operation on the current string. The inverse flipping operation is an inverse flipping operation of the flipping operation. The process (2000) proceeds to (S2040).

At (S2040), the flipped reference string can be generated by performing the flipping operation on the original reference string, for example, based on the flipping operation or the flipping type for the current string that is indicated by the index (e.g., the flipping type index).

The flipped reference string can be generated by vertically flipping the original reference string based on the flipping operation or the flipping type being the vertical flipping operation. The flipped reference string can be generated by horizontally flipping the original reference string based on the flipping operation or the flipping type being the horizontal flipping operation. The flipped reference string can be generated by vertically and horizontally flipping the original reference string based on the flipping operation or the flipping type being the combined flipping operation. Alternatively, the flipped reference string can be generated in a single step based on the original reference string based on the flipping type being the combined flipping operation. The process (2000) proceeds to (S2050).

At (S2050), the current string can be reconstructed based on the flipped reference string, such as described with reference to FIGS. 15-19. The process (2000) proceeds to (S2099), and terminates. In some examples, the current string can include sample(s) (referred to as non-flipped sample(s)) that are not predicted using the flipping operation and samples predicted using the flipping operation. Thus the non-flipped sample(s) are predicted or coded not based on the flipped reference string. For example, the non-flipped sample(s)) are escape sample(s) coded directly, such as described with reference to FIGS. 18-19. The coded non-flipped samples and the predicted samples that are predicted using the flipping operation can be combined together to form the predicted current string, such as described with reference to FIGS. 18-19.

The process (2000) can be suitably adapted. Step(s) in the process (2000) can be modified and/or omitted. Additional step(s) can be added. Any suitable order of implementation can be used. In an example, after predicting the current string based on the flipped reference string, residues of the current block is transformed into transform coefficients and the transform coefficients are quantized. Alternatively, the transform and the quantization are skipped and the residues of the current block are considered to be zero.

In an example, at (S2020), if the flipping operation is determined as not used to predict the current string, the process (2000) can include a step where a reference string is determined based on another SV and the reference string is used to predict the current string without any flipping operation.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media.

Figure 21:
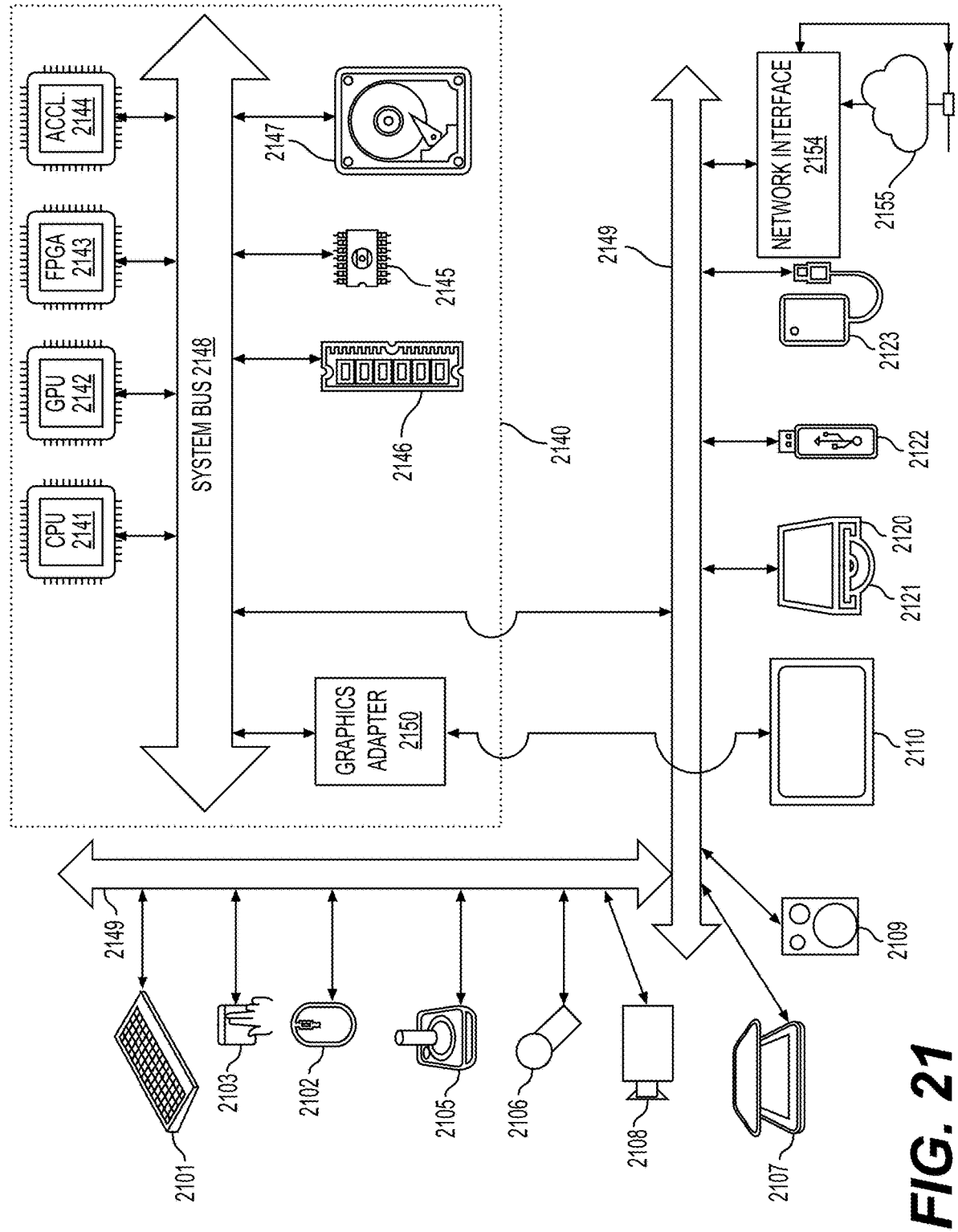
FIG. 21 is a schematic illustration of a computer system in accordance with an embodiment.

For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding coded information for a current block in a current picture from a coded video bitstream, the coded information indicating a string copy mode for the current block, the current block including a current string;
determining whether a flipping operation is performed to predict the current string; and
based on the flipping operation being determined as performed to predict the current string,
determining an original reference string based on a string vector of the current string,
generating a flipped reference string by performing the flipping operation on the original reference string, and
reconstructing the current string based on the flipped reference string, wherein
the current string is one of a plurality of strings included in the current block,
the coded information includes a block-level flag for the current block, a first value of the block-level flag indicating that each of the plurality of strings is to be predicted using a respective flipping operation, a second value of the block-level flag indicating that no flipping operation is to be performed on the plurality of strings, and
the determining whether the flipping operation is performed to predict the current string includes determining that the flipping operation is performed to predict the current string based on the block-level flag having the first value.

2. The method of claim 1, wherein
the flipping operation is one of (i) a vertical flipping operation, (ii) a horizontal flipping operation, and (iii) a combined flipping operation; and the generating includes:
- generating the flipped reference string by vertically flipping the original reference string based on the flipping operation being the vertical flipping operation,
- generating the flipped reference string by horizontally flipping the original reference string based on the flipping operation being the horizontal flipping operation, and
- generating the flipped reference string by vertically and horizontally flipping the original reference string based on the flipping operation being the combined flipping operation.

3. The method of claim 2, wherein
the coded information includes a string-level flag for the current string after a string length of the current string, the string-level flag indicating whether the flipping operation is performed to predict the current string.

4. The method of claim 1, wherein
the coded information includes a string-level flag of the current string, and
the determining whether the flipping operation is performed to predict the current string includes determining that the flipping operation is performed to predict the current string based on the string-level flag indicating that the flipping operation is performed to predict the current string.

5. The method of claim 1, wherein
the determining whether the flipping operation is performed to predict the current string includes determining that the flipping operation is prohibited for the current string based on a number of the plurality of strings in the current block being larger than a first threshold.

6. The method of claim 1, wherein
the determining whether the flipping operation is performed to predict the current string includes determining that the flipping operation is prohibited for the current string based on a string length of the current string being less than a second threshold, the string length of the current string corresponding to a number of samples in the current string.

7. The method of claim 1, wherein the determining whether the flipping operation is performed to predict the current string comprises:
determining that the flipping operation is prohibited for the current string based on the current string having a rectangular shape.

8. The method of claim 1, wherein
the current string has a rectangular shape and includes a sample that is not predicted using the flipping operation, and
the determining whether the flipping operation is performed to predict the current string includes determining that the flipping operation is performed to predict a plurality of samples in the current string that are different from the sample that is not predicted using the flipping operation.

9. The method of claim 8, wherein
the current string is the current block.

10. The method of claim 1, wherein the reconstructing comprises:
dequantizing transform coefficients; and
inversely transforming the transform coefficients into residues of the current block.

11. An apparatus for video decoding, comprising
processing circuitry configured to:
decode coded information for a current block in a current picture from a coded video bitstream, the coded information indicating a string copy mode for the current block, the current block including a current string;
determine whether a flipping operation is performed to predict the current string; and
based on the flipping operation being determined as performed to predict the current string,
determine an original reference string based on a string vector of the current string,
generate a flipped reference string by performing the flipping operation on the original reference string, and
reconstruct the current string based on the flipped reference string, wherein
the current string is one of a plurality of strings included in the current block,
the coded information includes a block-level flag for the current block, a first value of the block-level flag indicating that each of the plurality of strings is to be predicted using a respective flipping operation, a second value of the block-level flag indicating that no flipping operation is to be performed on the plurality of strings, and
the processing circuitry is configured to determine that the flipping operation is performed to predict the current string based on the block-level flag having the first value.

12. The apparatus of claim 11, wherein
the flipping operation is one of (i) a vertical flipping operation, (ii) a horizontal flipping operation, and (iii) a combined flipping operation; and
the processing circuitry is configured to:
generate the flipped reference string by vertically flipping the original reference string based on the flipping operation being the vertical flipping operation,
generate the flipped reference string by horizontally flipping the original reference string based on the flipping operation being the horizontal flipping operation, and
generate the flipped reference string by vertically and horizontally flipping the original reference string based on the flipping operation being the combined flipping operation.

13. The apparatus of claim 12, wherein
the coded information includes a string-level flag for the current string after a string length of the current string, the string-level flag indicating whether the flipping operation is performed to predict the current string.

14. The apparatus of claim 11, wherein
the coded information includes a string-level flag of the current string, and
the processing circuitry is configured to determine that the flipping operation is performed to predict the current string based on the string-level flag indicating that the flipping operation is performed to predict the current string.

15. The apparatus of claim 11, wherein the processing circuitry is configured to:
determine that the flipping operation is prohibited for the current string based on a number of the plurality of strings in the current block being larger than a first threshold.

16. The apparatus of claim 11, wherein the processing circuitry is configured to:
- determine that the flipping operation is prohibited for the current string based on a string length of the current string being less than a second threshold, the string length of the current string corresponding to a number of samples in the current string.

17. The apparatus of claim 11, wherein the processing circuitry is configured to:
- determine that the flipping operation is prohibited for the current string based on the current string having a rectangular shape.

18. The apparatus of claim 11, wherein
- the current string has a rectangular shape and includes a sample that is not predicted using the flipping operation, and
- the processing circuitry is configured to determine that the flipping operation is performed to predict a plurality of samples in the current string that are different from the sample that is not predicted using the flipping operation.

\* \* \* \* \*